US012701623B2

(12) United States Patent
He et al.

(10) Patent No.: US 12,701,623 B2
(45) Date of Patent: Aug. 4, 2026

(54) METHOD AND APPARATUS FOR SESSION MANAGEMENT

(71) Applicant: Telefonaktiebolaget LM Ericsson (publ), Stockholm (SE)

(72) Inventors: Yingjiao He, Shanghai (CN); Jinyin Zhu, Shanghai (CN); Yong Yang, Kållered (SE); Wen Zhang, Shanghai (CN)

( * ) Notice: Subject to any disclaimer, the term of this patent is extended or adjusted under 35 U.S.C. 154(b) by 1130 days.

(21) Appl. No.: 17/755,531

(22) PCT Filed: Oct. 12, 2020

(86) PCT No.: PCT/EP2020/078575
§ 371 (c)(1),
(2) Date: Apr. 29, 2022

(87) PCT Pub. No.: WO2021/083645
PCT Pub. Date: May 6, 2021

(65) Prior Publication Data
US 2022/0377826 A1     Nov. 24, 2022

(30) Foreign Application Priority Data
Oct. 31, 2019     (WO) ................ PCT/CN2019/114739

(51) Int. Cl.
*H04W 76/19*          (2018.01)
*H04L 61/5007*      (2022.01)
(Continued)

(52) U.S. Cl.
CPC ......... *H04W 76/19* (2018.02); *H04L 61/5007* (2022.05); *H04L 61/5061* (2022.05); *H04W 76/12* (2018.02); *H04W 80/10* (2013.01)

(58) Field of Classification Search
None
See application file for complete search history.

(56) References Cited

U.S. PATENT DOCUMENTS 10,448,268  B1      10/2019   Jaya et al.
2013/0034057  A1      2/2013   Aramoto et al.
(Continued)

FOREIGN PATENT DOCUMENTS

CN          20190578953          *   6/2016
JP          2010-063022  A          3/2010
(Continued)

OTHER PUBLICATIONS

Author Unknown, CR 29.274, Doc. No. C4-122174, pp. 1-7, Oct. 19, 2012.*
(Continued)

*Primary Examiner* — Christopher M Crutchfield
(74) *Attorney, Agent, or Firm* — Nicholson De Vos Webster & Elliott LLP

(57)          ABSTRACT

A method and apparatus for session management. The method at a control plane function comprises determining data to be restored in a user plane function or a first Internet Protocol (IP) address pool identifier. The method further comprises sending a first session establishment request to the user plane function, wherein the first session establishment request includes a data restoration flag and the data to be restored in the user plane function or includes the first Internet Protocol address pool identifier. The first Internet Protocol address pool identifier is used by the user plane function to assign an IP address to a user equipment from the first Internet Protocol address pool identifier.

18 Claims, 11 Drawing Sheets

(51) Int. Cl.
 H04L 61/5061 (2022.01)
 H04W 76/12 (2018.01)
 H04W 80/10 (2009.01)

(56) References Cited

U.S. PATENT DOCUMENTS

| | | | |
|---|---|---|---|
| 2013/0250749 | A1 | 9/2013 | Morishige et al. |
| 2016/0057801 | A1* | 2/2016 | Xia ....................... H04W 72/30 |
| | | | 370/221 |
| 2019/0182385 | A1 | 6/2019 | Yan et al. |
| 2020/0245163 | A1* | 7/2020 | Jaya ................... H04L 47/2475 |
| 2020/0404467 | A1* | 12/2020 | Yang ..................... H04M 15/61 |
| 2021/0112079 | A1* | 4/2021 | Campo Trapero ...... H04L 63/20 |
| 2022/0124601 | A1* | 4/2022 | Hu .......................... H04L 45/70 |
| 2022/0345532 | A1* | 10/2022 | Chandramouli ...... H04L 67/146 |

FOREIGN PATENT DOCUMENTS

| | | | |
|---|---|---|---|
| JP | | 2017-529810 A | 10/2017 |
| JP | | 2019-068416 A | 4/2019 |
| JP | | 7357153 B2 | 10/2023 |
| WO | PCT/CN2020/098561 | * | 12/2020 |

OTHER PUBLICATIONS

Author Unknown, Discussion paper on Tagging Create IEs, Doc. No. C4-194091, pp. 1-4, Oct. 11, 2019.*

Author Unknown, 3GPP TS 23.527 V16.1.0, pp. 1-19, Sep. 2019.*

Notice of Reasons for Refusal, JP App. No. 2023-161639, Dec. 20, 2024, 10 pages (5 pages of English Translation and 5 pages of Original Document).

Notice of Allowance, JP App. No. 2022-523247, Aug. 25, 2023, 5 pages (2 pages of English Translation and 3 pages of Original Document).

Office Action, CA App. No. 3156385, Oct. 4, 2023, 6 pages.

Office Action, JP App. No. 2023-161639, Aug. 22, 2025, 05 pages (02 pages of English Translation and 03 pages of Original Document).

Invitation to Pay Additional Fees for Application No. PCT/EP2020/078575, dated Dec. 22, 2020, 14 pages.

International Search Report and Written Opinion for Application No. PCT/EP2020/078575, dated Mar. 12, 2021, 24 pages.

Written Opinion of the International Preliminary Examining Authority for Application No. PCT/EP2020/078575, dated Oct. 15, 2021, 12 pages.

International Preliminary Report on Patentability for Application No. PCT/EP2020/078575, dated Jan. 28, 2022, 25 pages.

3GPP TS 23.007 V15.4.0, "3rd Generation Partnership Project; Technical Specification Group Core Network and Terminals; Restoration procedures (Release 15)," Sep. 2019, 107 pages, 3GPP Organizational Partners.

3GPP TS 23.214 V15.5.0, "3rd Generation Partnership Project; Technical Specification Group Services and System Aspects; Architecture enhancements for control and user plane separation of EPC nodes; Stage 2 (Release 15)," Dec. 2018, 92 pages, 3GPP Organizational Partners.

3GPP TS 23.214 V16.0.0, "3rd Generation Partnership Project; Technical Specification Group Services and System Aspects; Architecture enhancements for control and user plane separation of EPC nodes; Stage 2 (Release 16)," Jun. 2019, 92 pages, 3GPP Organizational Partners.

3GPP TS 23.501 V16.1.0, "3rd Generation Partnership Project; Technical Specification Group Services and System Aspects; System Architecture for the 5G System; Stage 2 (Release 16)," Jun. 2019, 368 pages, 3GPP Organizational Partners.

3GPP TS 23.527 V16.1.0, "3rd Generation Partnership Project; Technical Specification Group Core Network and Terminals; 5G System; Restoration Procedures (Release 16)," Sep. 2019, 19 pages, 3GPP Organizational Partners.

3GPP TS 29.244 V15.5.0, "3rd Generation Partnership Project; Technical Specification Group Core Network and Terminals; Interface between the Control Plane and the User Plane Nodes; Stage 3 (Release 15)," Mar. 2019, 208 pages, 3GPP Organizational Partners.

3GPP TS 29.244 V16.0.0, "3rd Generation Partnership Project; Technical Specification Group Core Network and Terminals; Interface between the Control Plane and the User Plane Nodes; Stage 3 (Release 16)," Jun. 2019, 217 pages, 3GPP Organizational Partners.

3GPP TS 29.244 V16.1.0, "3rd Generation Partnership Project; Technical Specification Group Core Network and Terminals; Interface between the Control Plane and the User Plane Nodes; Stage 3 (Release 16)," Sep. 2019, 243 pages, 3GPP Organizational Partners.

Ericsson, "UE IP address Pool Identity," Nov. 11-15, 2019, 7 pages, 3GPP TSG-CT WG4 Meeting #95, C4-195078, Reno, USA.

Ericsson, "Reestablishment of PFCP sessions after a UP function restart," Nov. 11-15, 2019, 4 pages, 3GPP TSG-CT WG4 Meeting #95, C4-195541, Reno, USA.

Huawei, "UE IP address pool based on IP version," Jun. 2-12, 2020, 8 pages, 3GPP TSG-CT WG4 Meeting #98e, C4-203200, E-Meeting.

* cited by examiner

Figure 3:
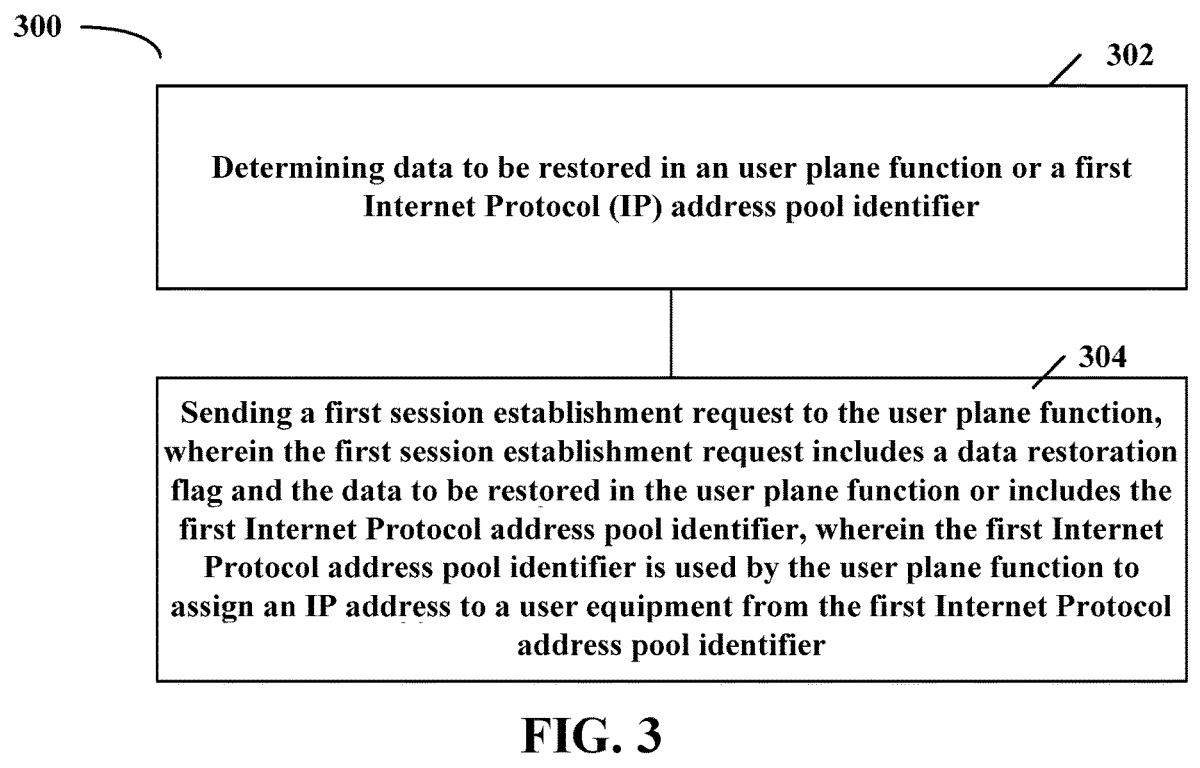

300

302

Determining data to be restored in an user plane function or a first
Internet Protocol (IP) address pool identifier

304

Sending a first session establishment request to the user plane function,
wherein the first session establishment request includes a data restoration
flag and the data to be restored in the user plane function or includes the
first Internet Protocol address pool identifier, wherein the first Internet
Protocol address pool identifier is used by the user plane function to
assign an IP address to a user equipment from the first Internet Protocol
address pool identifier

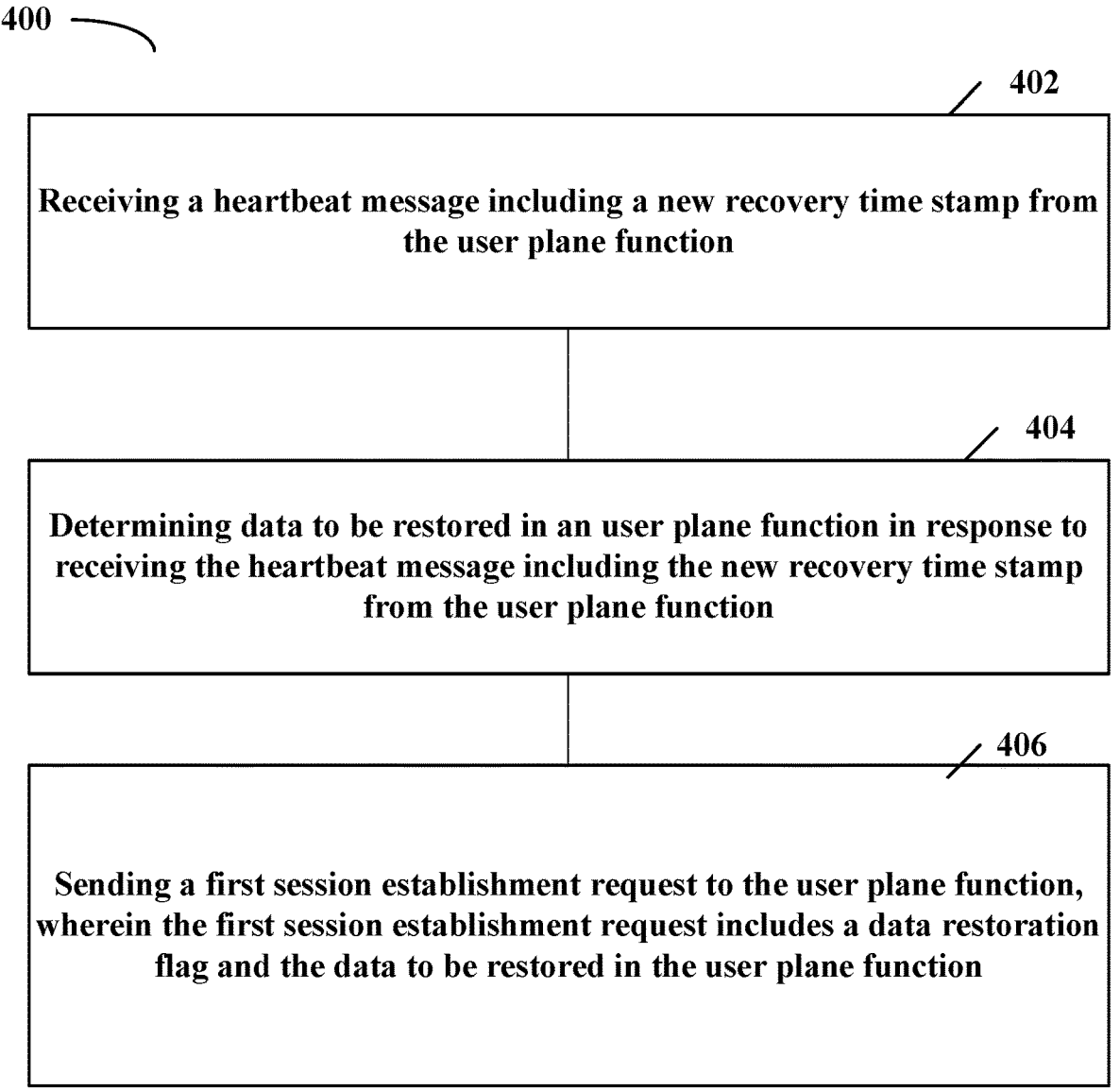

402

Receiving a heartbeat message including a new recovery time stamp from the user plane function

404

Determining data to be restored in an user plane function in response to receiving the heartbeat message including the new recovery time stamp from the user plane function

406

Sending a first session establishment request to the user plane function, wherein the first session establishment request includes a data restoration flag and the data to be restored in the user plane function

Figure 5:
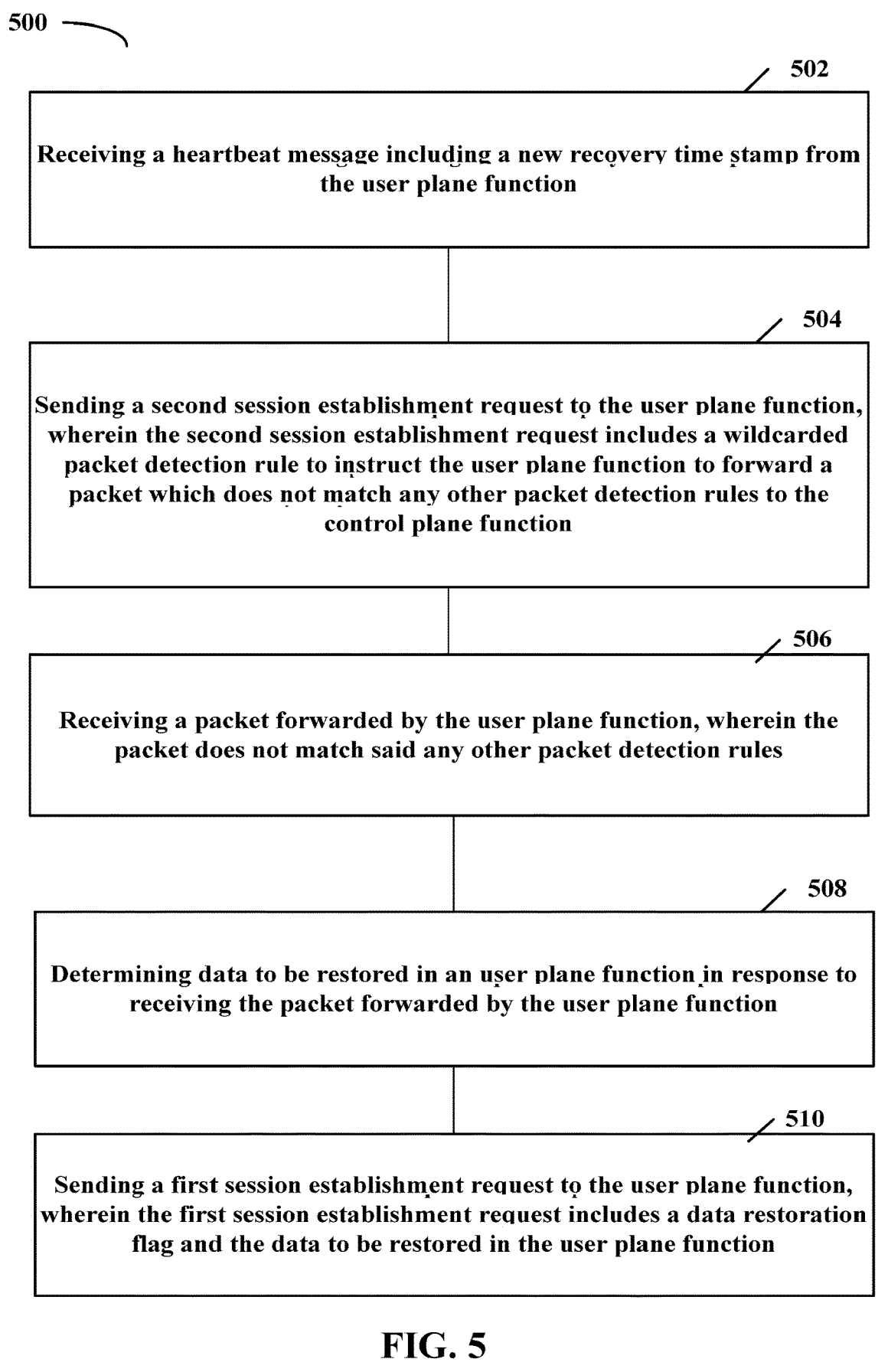

Receiving a heartbeat message including a new recovery time stamp from the user plane function

504

Sending a second session establishment request to the user plane function, wherein the second session establishment request includes a wildcarded packet detection rule to instruct the user plane function to forward a packet which does not match any other packet detection rules to the control plane function

506

Receiving a packet forwarded by the user plane function, wherein the packet does not match said any other packet detection rules

508

Determining data to be restored in an user plane function in response to receiving the packet forwarded by the user plane function

510

Sending a first session establishment request to the user plane function, wherein the first session establishment request includes a data restoration flag and the data to be restored in the user plane function

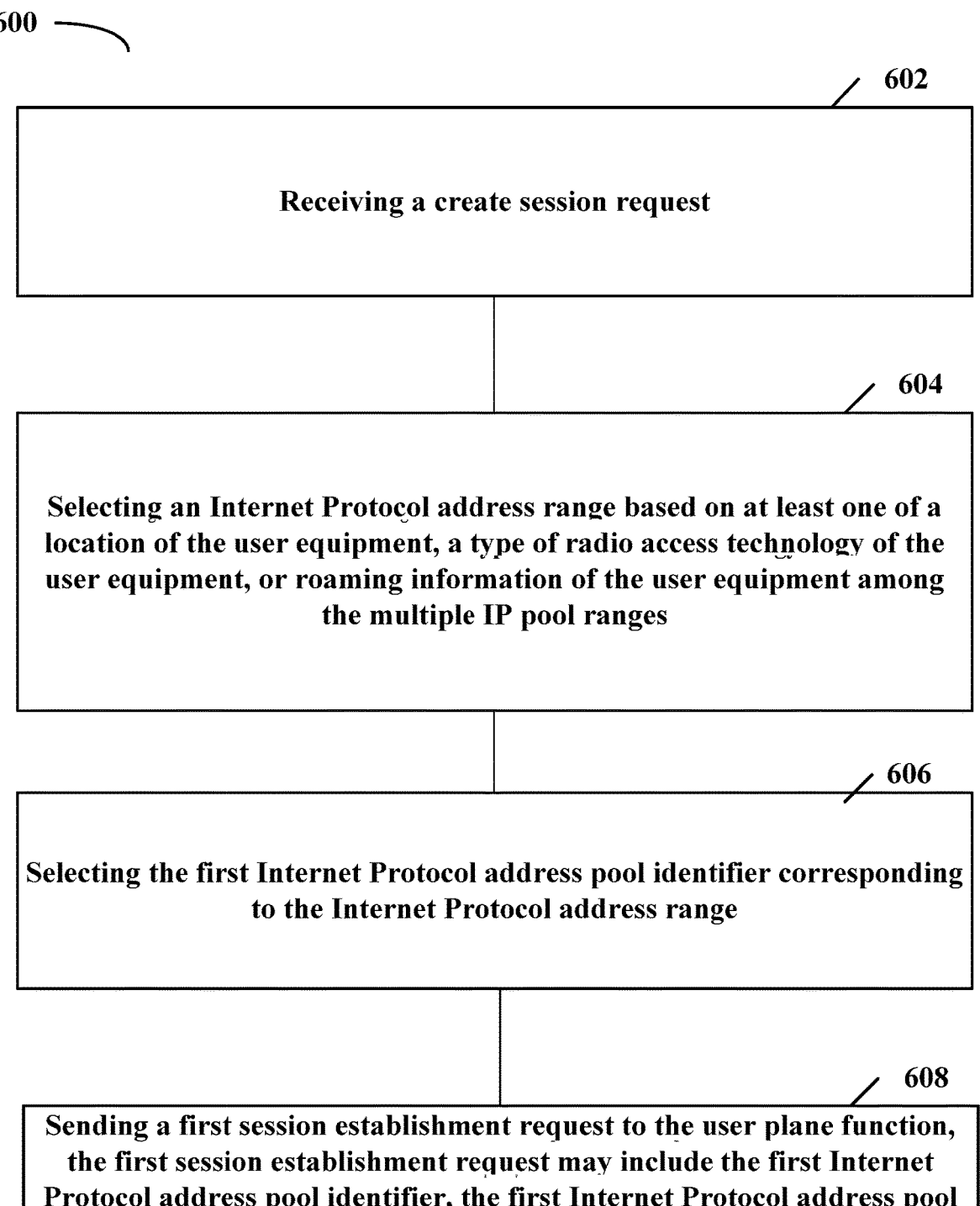

602

Receiving a create session request

604

Selecting an Internet Protocol address range based on at least one of a location of the user equipment, a type of radio access technology of the user equipment, or roaming information of the user equipment among the multiple IP pool ranges

606

Selecting the first Internet Protocol address pool identifier corresponding to the Internet Protocol address range

608

Sending a first session establishment request to the user plane function, the first session establishment request may include the first Internet Protocol address pool identifier, the first Internet Protocol address pool identifier may be used by the user plane function to assign an IP address to a user equipment from the first Internet Protocol address pool identifier

Figure 7:
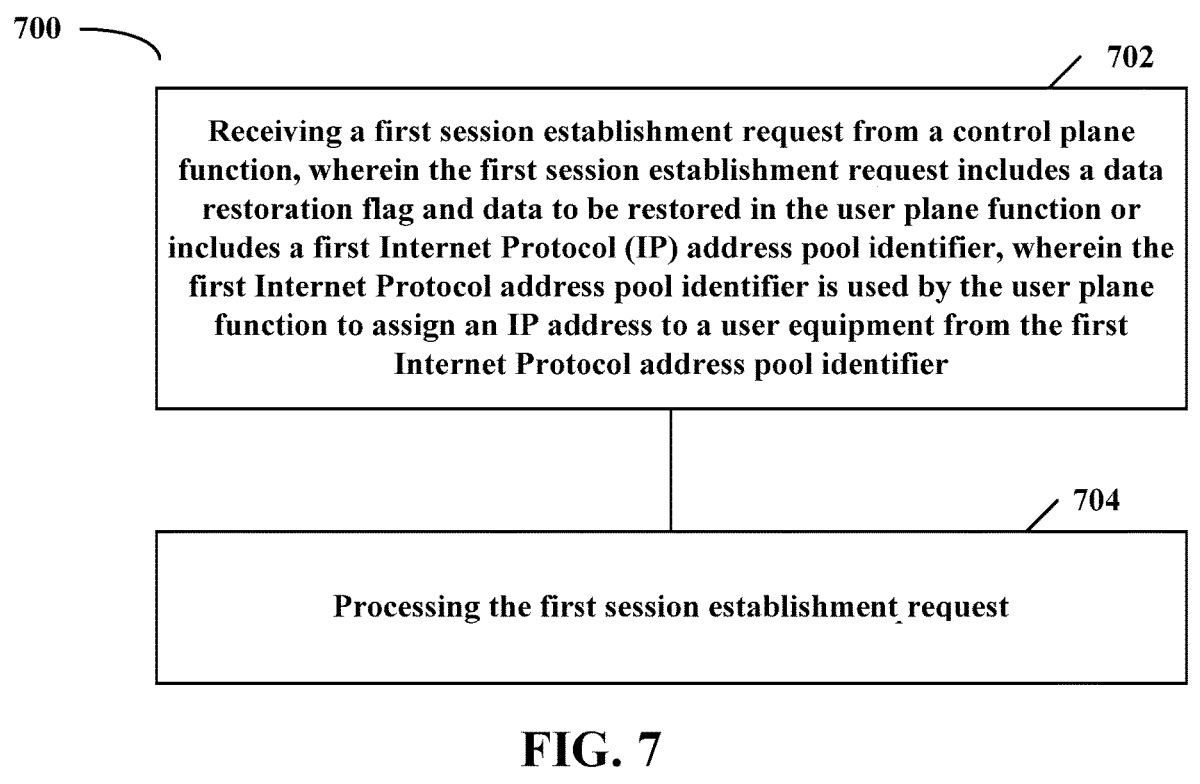

Receiving a first session establishment request from a control plane function, wherein the first session establishment request includes a data restoration flag and data to be restored in the user plane function or includes a first Internet Protocol (IP) address pool identifier, wherein the first Internet Protocol address pool identifier is used by the user plane function to assign an IP address to a user equipment from the first Internet Protocol address pool identifier

704

Processing the first session establishment request

Figure 9:
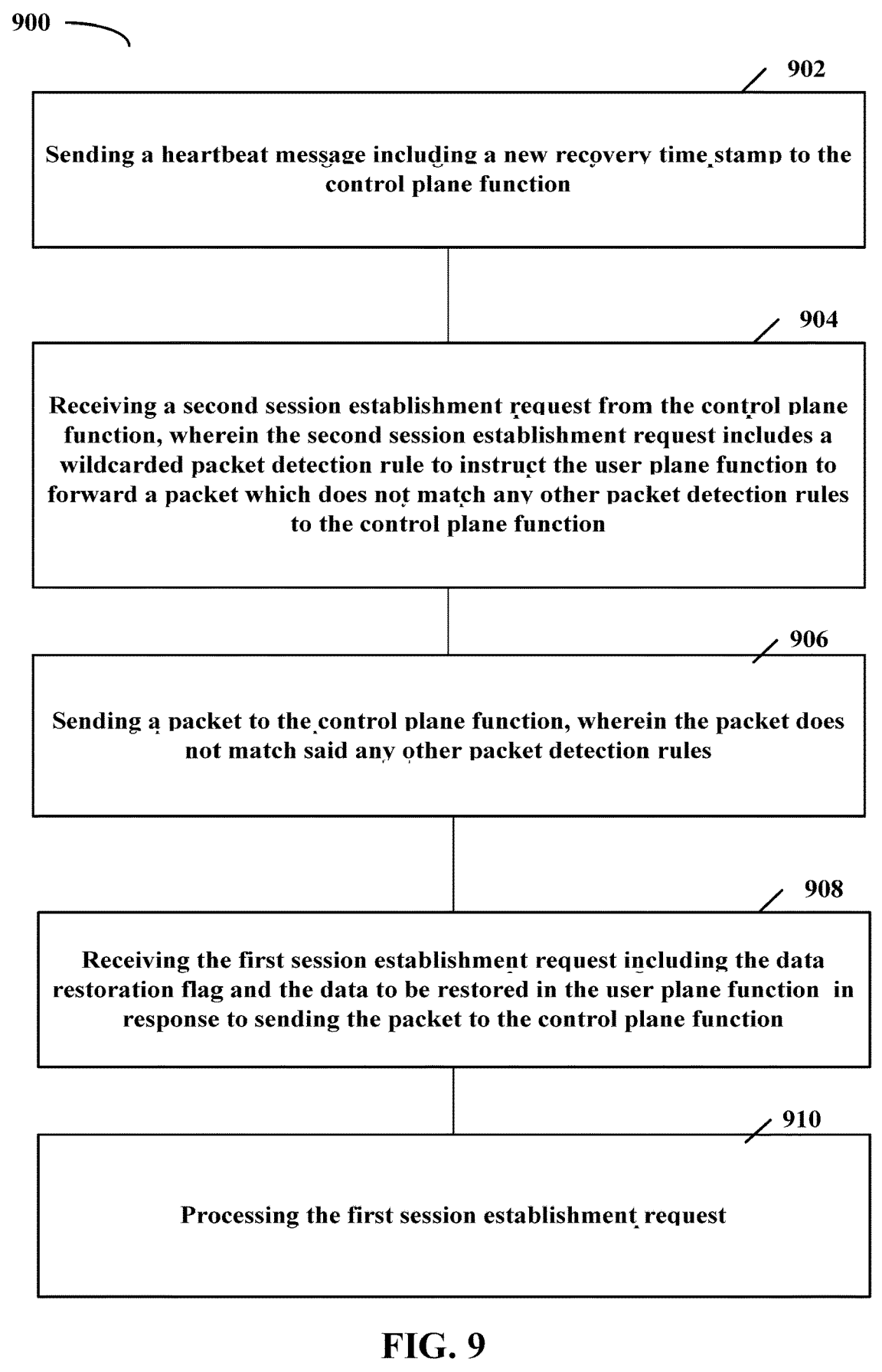

Sending a heartbeat message including a new recovery time stamp to the control plane function

/ 904

Receiving a second session establishment request from the control plane function, wherein the second session establishment request includes a wildcarded packet detection rule to instruct the user plane function to forward a packet which does not match any other packet detection rules to the control plane function

/ 906

Sending a packet to the control plane function, wherein the packet does not match said any other packet detection rules

/ 908

Receiving the first session establishment request including the data restoration flag and the data to be restored in the user plane function in response to sending the packet to the control plane function

/ 910

Processing the first session establishment request

METHOD AND APPARATUS FOR SESSION MANAGEMENT

CROSS-REFERENCE TO RELATED APPLICATIONS

This application is a National stage of International Application No. PCT/EP2020/078575, filed Oct. 12, 2020, which claims priority to International Application No. PCT/CN2019/114739, filed Oct. 31, 2019, which are hereby incorporated by reference.

TECHNICAL FIELD

The non-limiting and exemplary embodiments of the present disclosure generally relate to the technical field of communications, and specifically to methods and apparatuses for session management.

BACKGROUND

This section introduces aspects that may facilitate a better understanding of the disclosure. Accordingly, the statements of this section are to be read in this light and are not to be understood as admissions about what is in the prior art or what is not in the prior art.

An architecture of control and user plane separation (CUPS) of various network devices such as SGW (serving gateway), PGW (packet data network (PDN) gateway) and TDF (traffic detection function), etc. has been introduced in a communication network. For example, 3rd Generation Partnership Project (3GPP) TS23.214 V16.0.0 and TS29.244 V16.0.0, the disclosures of which are incorporated by reference herein in their entirety, have defined various interfaces between the control plane nodes (or functions) and the user plane nodes (or functions). As described in 3GPP TS23.214 V16.0.0, an Sxb interface is defined between a PGW control plane (PGW-C) and a PGW user plane (PGW-U), an Sxa interface is defined between a SGW control plane (SGW-C) and a SGW user plane (SGW-U), and an Sxc interface is defined between a TDF control plane (TDF-C) and a TDF user plane (TDF-U). As described in 3GPP TS29.244 V16.0.0, an N4 interface is defined between a Session Management Function (SMF) and User Plane Function (UPF). Moreover, 3GPP TS23.214 V16.0.0 and TS29.244 V16.0.0 have defined various packet forwarding control protocol (PFCP) node related procedures and PFCP session related procedures between the control plane nodes (or functions) and the user plane nodes (or functions).

3GPP TS23.007 V15.4.0, the disclosure of which is incorporated by reference herein in their entirety, has defined the handling of restoration of PFCP sessions for user plane node (such as SGW-U, PGW-U) failure in 4G (fourth generation) wireless communication network:

16.1A.4 SGW-U Failure
The SGW-C will receive the recovery time stamps of the PFCP entity(ies) in the SGW-U in PFCP heartbeat request/response messages.
Restoration of Sx sessions may start immediately after the Sx association setup procedure:
  if the restoration is supported in the SGW-C on a proactive basis, the SGW-C may start re-establishing Sx sessions matching any PDRs.
  if the restoration is supported in the SGW-C on a reactive basis:
    the SGW-C shall establish an Sx session with a wild-carded PDR to instruct the UP function to forward G-PDU packets which are not matching any other PDRs to the CP function (to a F-TEID-uniquely assigned in the CP function for this Sx-u tunnel);
  upon receipt of G-PDUs from this Sx-u tunnel, the CP function shall then check if it has an active session for each received G-PDU packet:
    if so, the CP function shall perform Sx Session establishment procedures to re-establish the corresponding Sx sessions in the SGW-U;
    otherwise the CP function shall generate a GTP-U Error Indication with a destination address set to the source IP address of the received G-PDU, and send it to the UP function. The UP function shall forward this GTP-U Error Indication transparently. The CP function shall delete the G-PDU after the check for active sessions.

17.1A.4 PGW-U Failure
The PGW-C will receive the recovery time stamps of the PFCP entity(ies) in the PGW-U in and PFCP heartbeat requests/responses.
The PGW-C may start restoring Sx sessions in the PGW-U and it may:
  if re-establishment of Sx association is required, immediately re-establish the Sx association between the PGW-C and the PGW-U;
  re-establish Sx sessions affected by the PGW-U failure.

17.1b.2 Restoration Procedures
During or immediately after an PGW-U Restart, the PGW-U shall place local PGW-U Recovery Time Stamp value in all Heartbeat Request/Response and Sx Association Setup Request/Response Messages.
Immediately after the re-establishment of an Sx association between the PGW-C and the PGW-U, the PGW-C may start restoring Sx sessions in the PGW-U.
  NOTE: Restoring Sx sessions in a PGW-U on a reactive basis (like defined for an SGW-U restart in clause 16.1A.4) is not supported in this release. In some cases, a restarted PGW-U cannot determine from the UE IP address the CP function responsible for an incoming packet for which no session exists, e.g. when a UP function is controlled by multiple CP function for the same APN and when the UE IP address was assigned by the PDN.

3GPP TS23.527 V16.1.0, the disclosure of which is incorporated by reference herein in their entirety, has defined the handling of restoration of PFCP sessions for user plane node (such as UPF) failure in 5G (fifth generation) wireless communication network:

4.3.2 Restoration Procedure for PSA UPF Restart
Immediately after the re-establishment of a PFCP association between the SMF and the UPF, the SMF may start restoring PFCP sessions in the UPF.

4.3.4 Restoration Procedure for Intermediate UPF Restart
The restoration of the PFCP sessions may start immediately after the PFCP association setup procedure:
  if the restoration is supported in the SMF on a proactive basis, the SMF may start re-establishing PFCP sessions matching any PDRs.
  if the restoration is supported in the SMF on a reactive basis:
    the SMF shall establish an PFCP session with a wild-carded PDR to instruct the Intermediate UPF to forward G-PDU packets which are not matching any other PDRs to the SMF (to a F-TEID-uniquely assigned in the SMF for this PFCP-u tunnel);

upon receipt of G-PDUs from this PFCP-u tunnel, the
SMF shall then check if it has an active session for
each received G-PDU packet:
    if so, the SMF shall perform the PFCP Session
        establishment procedures to re-establish the corresponding PFCP sessions in the Intermediate
        UPF;
    otherwise the SMF shall generate a GTP-U Error
        Indication with a destination address set to the
        source IP address of the received G-PDU, and
send it to the Intermediate UPF. The Intermediate
        UPF shall forward this GTP-U Error Indication
        transparently. The SMF shall delete the G-PDU
        after the check for active sessions.
3GPP TS23.214 V16.0.0 and TS29.244 V16.0.0 have
defined the same F-TEID (a fully qualified tunnel endpoint
identifier of a general packet radio service tunneling Proto-
col user plane tunnel) allocation method used for a user
plane node (such as UPF):
3GPP TS29.244 V16.0.0:
5.5 F-TEID Allocation and Release
The UP function shall set the FTUP feature flag in the UP
    Function Features IE if it supports F-TEID allocation in
    the UP function (see subclause 8.2.25). If so, the CP
    function shall determine whether F-TEIDs are allocated
by the CP function or the UP function based on network
    configuration. The same F-TEID allocation option shall
    be used by all the CP functions controlling a particular UP
    function. The UP function shall reject a request to estab-
    lish a new PDR with a different F-TEID allocation option
than the option used for already created PDRs (by the
    same or a different CP function), with the cause "Invalid
    F-TEID allocation option".
3GPP TS23.214 V16.0.0
5.4 GTP-U IP Address and TEIDu Allocation
5.4.1 General
Whether F-TEIDu allocation/release is performed by CP
    function or UP function is determined by network con-
    figuration of the CP functions. When both F-TEIDu
    allocation in CP function and F-TEIDu allocation in UP
function coexist in the same network, the same F-TEIDu
    allocation option shall be used by all the CP functions
    controlling a particular UP function.
3GPP TS29.244 V16.0.0
Table 7.5.2.2-2: PDI IE within PFCP Session Establishment
Request
The CP function shall set the CHOOSE (CH) bit to 1 if the
    UP function supports the allocation of F-TEID and the CP
    function requests the UP function to assign a local
    F-TEID to the PDR.
3GPP TS23.501 V16.1.0, the disclosure of which is
incorporated by reference herein in their entirety, has defined
UE (user equipment) IP (Internet Protocol) Address Pool ID
(identifier) for DHCP (Dynamic Host Configuration Proto-
col))/DN-AAA (Data Network—authentication, authorization, and accounting) server to identify the range of IP
address to be allocated, this IP range belongs to the selected
UPF node. As described in clause 5.8.2.2 of 3GPP TS23.501
V16.1.0, the IP address allocation request sent to DHCP/
DN-AAA server may include the IP address pool ID to
identify which range of IP address is to be allocated. In this
case the SMF is provisioned with separate IP address pool
ID(s), and the mapping between IP address pool ID and UPF
Id, DNN (Data Network Name), S-NSSAI (Single Network
Slice Selection Assistance Information), IP version. The
provision is done by OAM (Operations, administration and
management) or during the N4 Association Setup procedure.

4

A given IP address pool is controlled by a unique entity
(either the SMF or the UPF or an external server). The IP
address managed by the UPF can be partitioned into mul-
tiple IP address pool partition(s), i.e. associated with mul-
tiple IP address pool ID(s).

SUMMARY

This summary is provided to introduce a selection of
concepts in a simplified form that are further described
below in the detailed description. This summary is not
intended to identify key features or essential features of the
claimed subject matter, nor is it intended to be used to limit
the scope of the claimed subject matter.
    According to 3GPP TS23.007 V15.4.0 and TS23.527
V16.1.0, the PFCP Session Restoration procedure for UP
failure in 4G and 5G wireless communication network may
be as the following. The control plane (CP) may detect that
the UP is restarted and restoration is required, and the CP
may send PFCP Association Setup Request to the UP to
re-establish PFCP association. For reactive restoration, the
CP such as SGW-C/SMF may establish an PFCP session
with a wildcarded PDR (Packet Detection Rule) to instruct
the UP such as SGW-U/I-UPF (Intermediate UPF) function
to forward G-PDU(GTP(general packet radio service
(GPRS) tunnelling protocol) encapsulated user Plane Data
Unit (PDU)))/T-PDU (Transport PDU) packets which are
not matching any other PDRs to the CP such as the SGW-
C/SMF function (to a F-TEID-uniquely assigned in the CP
function for a Sx/N4-u tunnel). Note: for PGW-U/UPF-PSA
(packet data unit session anchor), reactive restoration is not
supported in current 3GPP standard. For reactive restoration,
when the CP receives the GTP-U packets on the SX-u tunnel
from the UP, the CP finds the corresponding stored PFCP
sessions and FPCP information. For both proactive and
reactive restoration methods, the CP sends PFCP Session
Establishment Request to re-establish the PFCP session. For
the F-TEID IE (information element) in PDI(Packet Detec-
tion Information) and Create Traffic Endpoint, the existing
F-TEID value stored in control plane will be included and
the CHOOSE (CH) bit is set to 0 since there is no need for
UP allocating F-TEID-u. (Note: According to 3GPP
TS29.244 V16.0.0: the CP function shall set the CHOOSE
(CH) bit to 1 if the UP function supports the allocation of
F-TEID and the CP function requests the UP function to
assign a local F-TEID to the PDR). For the UE IP Address
IE in PDI and Create Traffic Endpoint, the UE IP address is
the stored IP address allocated for the PDN/PDU(protocol
data unit) session and the CH bit is set 0 since there is no
need for UP allocating IP address. (Note: According to
TS29.2443GPP TS29.244 V16.0.0, the CP function shall set
the CHOOSE (CH) bit to 1 if the UP function supports the
allocation of UE IP address/prefix and the CP function
requests the UP function to assign a UE IP address/prefix to
the PDR). The UP shall use the received PFCP session
information (F-TEID-u, PDR/FAR(Forwarding Action
Rule)) to restore this PFCP session in the restarted UP.
Meanwhile if a new Create Session Request received in CP,
the CP shall send PFCP Session Establishment request with
F-TEID/CH=1 to ask UP to allocate the F-TEID-u for this
PFCP session since the UP allocated F-TEID-u method is
used, and/or, with UE IP address/CH=1 to ask UP to allocate
the IP address since UP allocated IP address is used.
    However there may be some problems for PFCP Session
Restoration Procedure for the failed UP (user plane).
    Problem 1: there is a confliction between the restoration
of PFCP session (working as CP allocating F-TEID-u) and a new establishment of PFCP session in UP (working as UP allocating F-TEID-u) regarding the F-TEID-u allocation. UP may reject either the request for restoration purpose or the request for the new session establishment. According to 3GPP TS23.214 V16.0.0 and TS29.244 V16.0.0, the same F-TEID allocation option shall be used by all the CP functions controlling a particular UP function. However, during a restoration procedure for a UPF restart, the CP function need to include the existing GTP-U F-TEID and/or UE IP Address for the PFCP session to be restored in the PFCP Session Establishment Request to restore the PFCP session. This may be a problem, since for new PFCP sessions due to new PDN/PDU session establishment, the UP function may allocate GTP-u F-TEID, while for the session to be restored, the UP function may accept the CP "allocated" GTP-u F-TEID. This problem may apply to all kinds of UP failure and applies for both reactive and proactive restoration.

Problem 2: there is a conflict between the restoration of PFCP session (working as CP allocating UE IP address) and a new establishment of PFCP session in UP (working as UP allocating UE IP address) regarding UE IP address allocation. UP may reject either the request for restoration purpose or the request for the new session establishment. This problem may apply to some UPs such as PGW-U and UPF anchor which allocated UE IP address during the PDN/PDU session establishment procedure.

Problem 3: the reactive restoration for PGW-U or UPF anchor failure is not supported in existing 3GPP specification. For example, a restarted PGW-U/UPF anchor cannot determine from the UE IP address the CP function responsible for an incoming packet for which no session exists, e.g. when a UP function is controlled by multiple CP function for the same APN and when the UE IP address was assigned by the PDN.

Problem 4: when the method of UP allocating UE IP address is used, after UPF is selected, the UE IP address range(s) corresponding to this UPF is determined, but if the operator want to select one specific IP address range among the multiple IP pool ranges for the selected UPF based on the specific condition, e.g., location based UE IP address selection (which supported in non-CUPS) and/or RAT (radio access technology) type and/or roaming based UE IP address selection, it has a problem in CUPS, since CP knows the UE location and/or RAT type and/or roaming information, but the UP has no UE location and/or RAT type and/or roaming information.

To overcome or mitigate at least one of above mentioned problems or other problems, the embodiments of the present disclosure propose an improved solution of session management.

In an embodiment, when a CP sends a session establishment request such as PFCP session establishment request to a UP for restoration purpose, a new restoration indication may be included in the session establishment request so that the UP can get aware of this restoration.

In an embodiment, a new information element (IE) UE IP address Pool ID may be introduced in a session establishment request such as PFCP session establishment request. For example, the IE UE IP address pool ID may be included in the session establishment request such as PFCP session establishment request.

In an embodiment, for restoration purpose after a UP such as PGW-U or UPF anchor restart, when DHCP/DNN-AAA server is used for UE IP address assignment, the new UE IP address pool ID may be added in the PFCP Session Establishment Request message for Sx/N4-U tunnel establishment, this new UE IP address pool ID may require the UP to only forward the payload IP packet whose source IP address or destination IP address belongs to this UE IP address pool ID (i.e., the corresponding CP) on this Sx/N4-u tunnel. The UP such as PGW-U or UPF anchor also needs configure the detail IP address range associated with the UE IP address pool ID. The embodiment can enable the reactive restoration method supporting for PGW-U failure and UPF anchor failure.

In an embodiment, during the PDN/PDU session establishment procedure, for selecting one specific UE IP address range among the multiple UE IP pool ranges for the UP such as UPF, e.g., location based UE IP address selection (which supported in non-CUPS) and/or RAT type and/or roaming based UE IP address selection, the CP can firstly select UPF and select one IP address range among the multiple IP pool ranges according to UE location and/or RAT type and/or roaming information, and then send the corresponding UE IP address pool ID in the PFCP Session Establishment Request to the UP such as UPF. The UP such as UPF may assign the IP address from this UE IP address pool ID for a PDN connection.

In a first aspect of the disclosure, there is provided a method at a control plane function. The method comprises determining data to be restored in an user plane function or a first Internet Protocol (IP) address pool identifier. The method further comprises sending a first session establishment request to the user plane function, wherein the first session establishment request includes a data restoration flag and the data to be restored in the user plane function or includes the first Internet Protocol address pool identifier. The first Internet Protocol address pool identifier is used by the user plane function to assign an IP address to a user equipment from the first Internet Protocol address pool identifier.

In an embodiment, the method may further comprise receiving a heartbeat message including a new recovery time stamp from the user plane function.

In an embodiment, determining data to be restored in an user plane function is in response to receiving the heartbeat message including the new recovery time stamp from the user plane function.

In an embodiment, the method may further comprise sending a second session establishment request to the user plane function. The second session establishment request may include a wildcarded packet detection rule to instruct the user plane function to forward a packet which does not match any other packet detection rules to the control plane function.

In an embodiment, the method may further comprise receiving a packet forwarded by the user plane function, wherein the packet does not match said any other packet detection rules. Determining data to be restored in an user plane function is in response to receiving the packet forwarded by the user plane function.

In an embodiment, the second session establishment request may be a packet forwarding control Protocol (PFCP) session establishment request.

In an embodiment, the data restoration flag may be set when the control plane function requests the user plane function to restore the data in the user plane function.

In an embodiment, the data restoration flag may be included in an information element which is included in the first session establishment request.

In an embodiment, the data to be restored in the user plane function may be a packet forwarding control Protocol, PFCP, session information.

In an embodiment, the data to be restored in the user plane function may include at least one of a fully qualified tunnel endpoint identifier of a general packet radio service tunneling Protocol user plane tunnel, F-TEID-u, information element and user equipment Internet Protocol address information element in Packet Detection Information, PDI; or F-TEID-u information element and user equipment Internet Protocol address information element in Create Traffic Endpoint.

In an embodiment, the user plane function may be a restarted user plane function.

In an embodiment, determining the first Internet Protocol (IP) address pool identifier may comprise receiving a create session request; selecting an Internet Protocol address range based on at least one of a location of the user equipment, a type of radio access technology of the user equipment, or roaming information of the user equipment among the multiple IP pool ranges;

and selecting the first Internet Protocol address pool identifier corresponding to the Internet Protocol address range.

In an embodiment, the first session establishment request may be a packet forwarding control Protocol (PFCP) session establishment request.

In an embodiment, the first session establishment request includes the data restoration flag and the data to be restored in the user plane function, the control plane function may be one of packet data network (PDN) gateway control plane function (PGW-C), serving gateway control plane function (SGW-C), traffic detection function control plane function (TDF-C), and session management function (SMF), and the user plane function may be one of PDN gateway user plane function (PGW-U), serving gateway user plane function (SGW-U), traffic detection function user plane function (TDF-U) and user plane function (UPF).

In an embodiment, the first session establishment request includes the first Internet Protocol address pool identifier, the control plane function may be one of packet data network (PDN) gateway control plane function (PGW-C) and session management function (SMF), and the user plane function may be one of PDN gateway user plane function (PGW-U), packet data unit session anchor user plane function (PSA UPF).

In a second aspect of the disclosure, there is provided a method at a user plane function. The method comprises receiving a first session establishment request from a control plane function. The first session establishment request includes a data restoration flag and data to be restored in the user plane function or includes a first Internet Protocol (IP) address pool identifier. The first Internet Protocol address pool identifier is used by the user plane function to assign an IP address to a user equipment from the first Internet Protocol address pool identifier. The method further comprises processing the first session establishment request.

In an embodiment, the method may further comprise sending a heartbeat message including a new recovery time stamp to the control plane function.

In an embodiment, receiving the first session establishment request including the data restoration flag and the data to be restored in the user plane function may be in response to sending the heartbeat message including the new recovery time stamp from the user plane function.

In an embodiment, the method may further comprise receiving a second session establishment request from the control plane function. The second session establishment request may include a wildcarded packet detection rule to instruct the user plane function to forward a packet which does not match any other packet detection rules to the control plane function.

In an embodiment, the method may further comprise sending a packet to the control plane function, wherein the packet does not match said any other packet detection rules. Receiving the first session establishment request including the data restoration flag and the data to be restored in the user plane function may be in response to sending the packet to the control plane function.

In a third aspect of the disclosure, there is provided an apparatus implemented in a control plane function. The apparatus comprises a processor; and a memory coupled to the processor, said memory containing instructions executable by said processor, whereby said apparatus is operative to determine data to be restored in an user plane function or a first Internet Protocol address pool identifier. Said apparatus is operative to send a first session establishment request to the user plane function, wherein the first session establishment request includes a data restoration flag and the data to be restored in the user plane function or includes the first Internet Protocol address pool identifier. The first Internet Protocol address pool identifier is used by the user plane function to assign an IP address to a user equipment from the first Internet Protocol address pool identifier.

In a fourth aspect of the disclosure, there is provided an apparatus implemented in a user plane function. The apparatus comprises a processor; and a memory coupled to the processor, said memory containing instructions executable by said processor, whereby said apparatus is operative to receive a first session establishment request from a control plane function. The first session establishment request includes a data restoration flag and data to be restored in the user plane function or includes a first Internet Protocol address pool identifier. The first Internet Protocol address pool identifier is used by the user plane function to assign an IP address to a user equipment from the first Internet Protocol address pool identifier. Said apparatus is further operative to process the first session establishment request.

In a fifth aspect of the disclosure, there is provided a control plane function. The control plane function comprises a determining module configured to determine data to be restored in an user plane function or a first Internet Protocol (IP) address pool identifier. The control plane function further comprises a sending module configured to send a first session establishment request to the user plane function, wherein the first session establishment request includes a data restoration flag and the data to be restored in the user plane function or includes the first Internet Protocol address pool identifier. The first Internet Protocol address pool identifier may be used by the user plane function to assign an IP address to a user equipment from the first Internet Protocol address pool identifier.

In a sixth aspect of the disclosure, there is provided a user plane function. The user plane function comprises a receiving module configured to receive a first session establishment request from a control plane function. The first session establishment request may include a data restoration flag and data to be restored in the user plane function or includes a first Internet Protocol (IP) address pool identifier. The first Internet Protocol address pool identifier may be used by the user plane function to assign an IP address to a user equipment from the first Internet Protocol address pool identifier. The control plane function further comprises a processing module configured to processing the first session establishment request.

In a seventh aspect of the disclosure, there is provided a computer program product comprising instructions which, when executed on at least one processor, cause the at least one processor to carry out the method according to the first aspect of the disclosure.

In an eighth aspect of the disclosure, there is provided a computer program product comprising instructions which, when executed on at least one processor, cause the at least one processor to carry out the method according to the second aspect of the disclosure.

In a ninth aspect of the disclosure, there is provided a computer-readable storage medium storing instructions which, when executed on at least one processor, cause the at least one processor to carry out the method according to the first aspect of the disclosure.

In tenth aspect of the disclosure, there is provided a computer-readable storage medium storing instructions which, when executed on at least one processor, cause the at least one processor to carry out the method according to the second aspect of the disclosure.

Embodiments herein afford many advantages, of which a non-exhaustive list of examples follows. Some embodiments herein may provide a clear logic for F-TEID u allocation for PFCP Session Restoration proactive and/or reactive mode for the failed user plane function such as UPF and may avoid the user plane function such as UPF rejecting the Session Establishment Request message such as PFCP Session Establishment Request message. Some embodiments herein may provide a clear logic for UE IP address allocation for PFCP Session Restoration proactive and/or reactive mode for the failed the user plane function such as UPF and may avoid the user plane function such as UPF rejecting the PFCP Session Establishment Request message. Some embodiments herein may solve at least one of the above described problems when the UE IP address is assigned by the external PDN. Some embodiments herein may enable the reactive restoration method supporting for PGW-U failure and UPF-A failure. Some embodiments herein may provide an efficient way for the UP forwarding the T-PDU payload traffic to the correct CP during the PFCP Session Restoration procedure. For UP allocating UE IP address method, some embodiments herein may provide a solution when the operator requires to assign a specific IP address range based on a condition, e.g., location based UE IP address selection, RAT type based UE IP address selection, roaming based UE IP address selection). The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 shows a flowchart of a method according to an embodiment of the present disclosure;

FIG. 4 shows a flowchart of a method according to another embodiment of the present disclosure;

FIG. 5 shows a flowchart of a method according to another embodiment of the present disclosure;

FIG. 6 shows a flowchart of a method according to another embodiment of the present disclosure;

FIG. 7 shows a flowchart of a method according to another embodiment of the present disclosure;

FIG. 9 shows a flowchart of a method according to another embodiment of the present disclosure;

DETAILED DESCRIPTION

Figure 1:
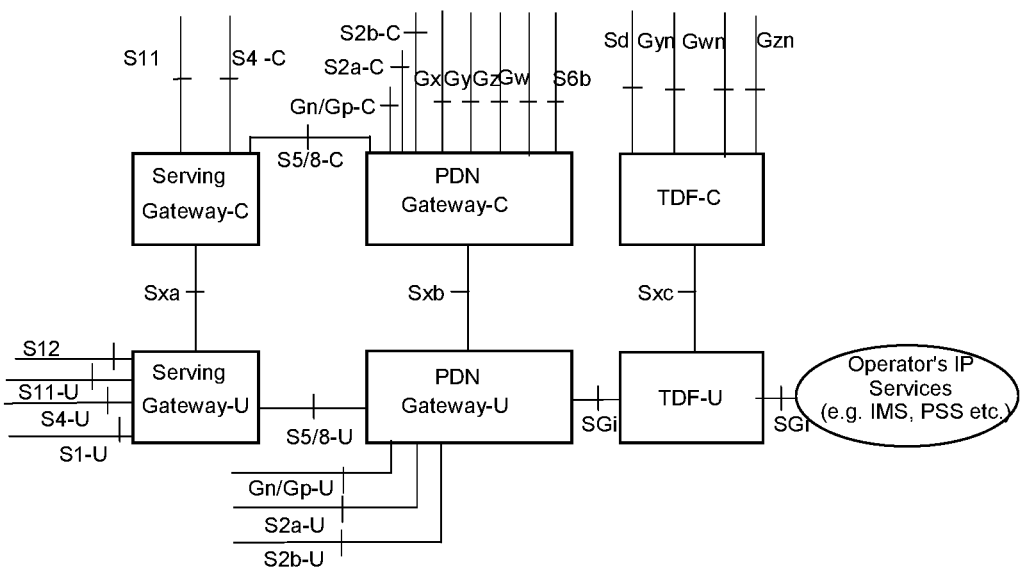
FIG. 1 schematically shows a system according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as may comprise the first generation (1G), 2G, 3G, 4G, 4.5G, 5G communication protocols, and/or any other protocols either currently known or to be developed in the future.

The term "network device" or "network node" used herein refers to a network entity such as a core network device in a communication network. For example, in a wireless communication network such as a 3GPP-type cellular network, the network node may comprise a control plane function (e.g., SMF, PGW-C, TDF-C and SGW-C) and a user plane function (e.g., UPF, PGW-U, TDF-U and SGW-U), etc., which may offer numerous services to customers who are interconnected by an access network device. Each access network device is connectable to the core network device over a wired or wireless connection.

The term "network function (NF)" refers to any suitable function which can be implemented in a network node (physical or virtual) such as a core network node of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function), RAN (radio access network), SCP (service communication proxy), etc. In other embodiments, the network function may comprise different types of NFs for example depending on a specific type of network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band interne of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 2:
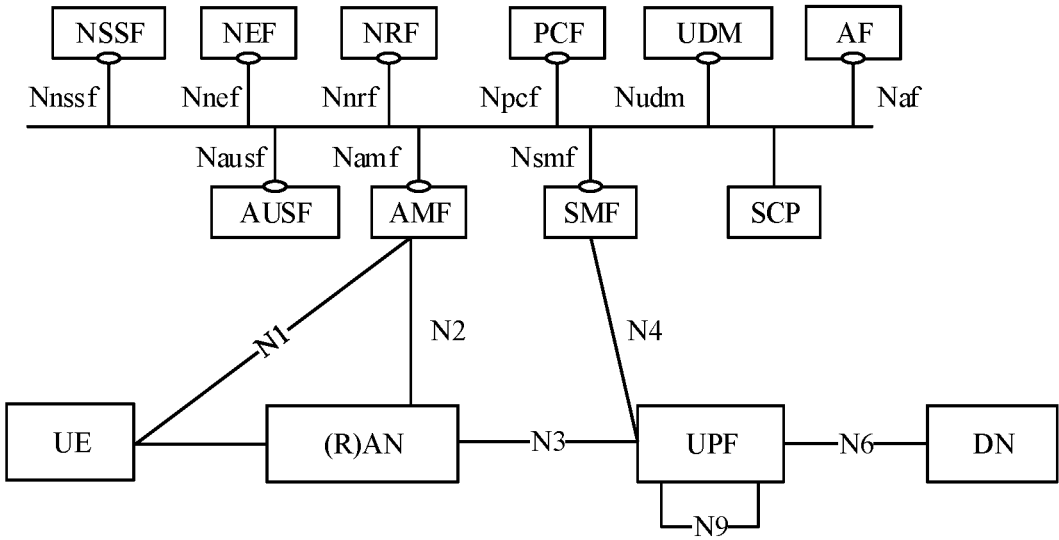
FIG. 2 schematically shows another system according to an embodiment of the present disclosure.

Although the subject matter described herein may be implemented in any appropriate type of system using any suitable components, the embodiments disclosed herein are described in relation to a communication system complied with the exemplary system architecture illustrated in FIG. 1 and FIG. 2. For simplicity, the system architectures of FIGS. 1-2 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a high level architecture of CUPS in the fourth generation network. The system architecture of FIG. 1 may be same as the Architecture reference model as described in clause 4.2 of 3GPP TS23.214 V16.0.0 and may comprise some exemplary network nodes such as serving gateway-C (SGW-C), serving gateway-U (SGW-U), PDN gateway-C (PGW-C), PDN gateway-U (PGW-U), TDF-C and TDF-U. As further illustrated in FIG. 1, the exemplary system architecture also contains the some interfaces such as Sxa. Sxb, Sxc, etc. Various network nodes shown in FIG. 1 may be responsible for functions for example as defined in 3GPP TS23.214 V16.0.0. Each PGW-C may manage/control one or more PGW-Us though only one PGW-U is shown in the system. Each SGW-C may manage/control multiple SGW-Us though only one SGW-U is shown in the system. Each TDF-C may manage/control multiple TDF-Us though only one TDF-U is shown in the system.

FIG. 2 schematically shows a high level architecture in the next generation network such as 5G. The system architecture of FIG. 2 may comprise some exemplary elements such as AUSF, AMF, DN (data network), NEF, NRF, NSSF, PCF, SMF, UDM, UPF, AF, UE, (R)AN, SCP, etc.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.1.0.

FIG. 3 shows a flowchart of a method according to an embodiment of the present disclosure, which may be performed by an apparatus implemented in/as or communicatively coupled to a control plane function. As such, the apparatus may provide means or modules for accomplishing various parts of the method 300 as well as means or modules for accomplishing other processes in conjunction with other components. The control plane function may be any suitable entity or node which can implement the control plane function. For example, the control plane function may be SGW-C, PGW-C, TDF-C, or SMF, etc.

At block 302, the control plane function determines data to be restored in an user plane function or a first IP address pool identifier. The user plane function may be a peer node of the control plane function. For example, when the control plane function is SGW-C, PGW-C, TDF-C, or SMF, the user plane function may be SGW-U, PGW-U, TDF-U, or UPF respectively. In an embodiment, the user plane function may be a restarted user plane function.

In an embodiment, the control plane function may determine the data to be restored in the user plane function. The data to be restored in the user plane function may be any suitable data which is required to be restored in the user plane function. For example, the data may be session information such as a PFCP session information. The control plane function may be triggered to determine the data to be restored in the user plane function in various ways, for example, when the control plane function detects that the user plane function is restarted, when the control plane function determines that some data should be restored in the user plane function, when the control plane function receives a data restoration indication from the user plane function, etc. As an example, when the control plane function receives the recovery time stamps of the user plane function in heartbeat request/response messages from the user plane function, the control plane function knows that the user plane function is restarted, and then the control plane function can re-establish an association such as (Sx association) between the control plane function and the user plane function and start either proactive restoration or reactive restoration. For proactive restoration, the control plane function can send a session establishment request (such as PFCP Session Establishment Request) with the stored information to the user plane function. For example, the restoration of at least one session between the control plane function and the user plane function may start immediately after the association setup procedure between the control plane function and the user plane function.

In an embodiment, the data to be restored in the user plane function may include at least one of a fully qualified tunnel endpoint identifier of a general packet radio service tunneling Protocol user plane tunnel (F-TEID-u) information element and user equipment Internet Protocol address information element in PDI or F-TEID-u and user equipment Internet Protocol address information IE in Create Traffic Endpoint. The term " F-TEID-u", "PDI" and " Create Traffic Endpoint" may be similar to the corresponding terms as described in 3GPP TS29.244 V16.0.0.

In an embodiment, the control plane function may determine a first IP address pool identifier. The first IP address pool identifier may be used by the user plane function to assign an IP address to a user equipment from the first Internet Protocol address pool identifier. For example, when the control plane function receives a create session request, the control plane function may determine the first IP address pool identifier to identify which range of IP address is to be allocated. The control plane function may determine the first Internet Protocol address pool based on various factors such as location information of the user equipment, a type of radio access technology of the user equipment, or roaming information of the user equipment, etc.

At block 304, the control plane function sends a first session establishment request to the user plane function. The first session establishment request may include a data restoration flag and the data to be restored in the user plane function or includes the first Internet Protocol address pool identifier. For example, when the control plane function determines the first IP address pool identifier at block 302, the control plane function sends the first session establishment request including the first Internet Protocol address pool identifier to the user plane function. When the control plane function determines the data to be restored in the user plane function at block 302, the control plane function sends the first session establishment request including the data restoration flag and the data to be restored in the user plane function to the user plane function.

In an embodiment, the data restoration flag may be set when the control plane function requests the user plane function to restore the data in the user plane function. For example, when the control plane function requests the user plane function to restore the data in the user plane function, the first session establishment request may include the data restoration flag and the data to be restored in the user plane function, otherwise the first session establishment request may not include the data restoration flag and the data to be restored in the user plane function.

In an embodiment, the data restoration flag may be included in an any suitable information element in the first session establishment request. As a first example, the data restoration flag may be included in an information element such as PFCPSEReq-Flags, which is included in the first session establishment request. The information element PFCPSEReq-Flags may include the data restoration flag such as RESTU. The CP function shall set this flag (i.e., RESTU) if the CP function requests the UP to restore the PFCP session when UP PFCP Session Restoration is required for a restarted UP.

In an embodiment, PFCPSEReq-Flags may be added in Table 7.5.2.1-1 of 3GPP TS29.244 V16.0.0:

In an embodiment, PFCPSEReq-Flags may be added in Table 8.1.2-1 of 3GPP TS29.244 V16.0.0:

TABLE 8.1.2-1

| Information Element Types | | | |
|---|---|---|---|
| IE Type value (Decimal) | Information elements | Comment/Reference | Number of Fixed Octets |
| aaa | PFCPSEReq-Flags | Extendable | |

Where "aaa" may be any suitable value such as 182, etc.

In an embodiment, the PFCPSEReq-Flags IE indicates flags applicable to the PFCP

Session Establishment Request message. It may be coded as depicted as following:

| | PFCPSEReq-Flags | | | | | | | |
|---|---|---|---|---|---|---|---|---|
| | | Bits | | | | | | |
| Octets | 8 | 7 | 6 | 5 | 4 | 3 | 2 | 1 |
| 1 to 2 | Type = 49 (decimal) | | | | | | | |
| 3 to 4 | Length = n | | | | | | | |
| 5 | Spare | | | | | | | RESTU |
| 6 to (n + 4) | These octet(s) is/are present only if explicitly specified | | | | | | | |

The following bits within Octet 5 shall indicate:

Bit 1—RESTU (Restoration Indication): if this bit is set to 1, it indicates to the UP function that the PFCP session to be established is to restore an existing PFCP session before the restart of the UP function, the UP function shall accept the GTP-U F-TEID and/or the UE IP Address which are provisioned by the CP function.

Bit 2 to 8—Spare, for future use, shall be set to 0 by the sender and discarded by the receiver.

In an embodiment, it may add a new indication such as PFCPSEReq-Flags in the PFCP Session Establishment Request message, to differentiate the new PFCP session establishment and restoration of an existing PFCP session. For example, the new indication may be added in the PFCP Session Establishment Request message when re-establishing an existing PFCP session in the UP function after restart, and when it is configured to use UP function allocation of GTP-U F-TEID and/or UE IP Address. The new indication in the PFCP Session Establishment Request message may indicate it is for the restoration of an existing PFCP session, not that the CP function determine to allocate F-TEID for

TABLE 7.5.2.1-1

| Information Elements in an PFCP Session Establishment Request | | | | | | | |
|---|---|---|---|---|---|---|---|
| Information elements | P | Condition/Comment | Sxa | Sxb | Sxc | N4 | IE Type |
| PFCPSEReq-Flags | C | This IE shall be included if at least one of the flags is set to 1. RESTU (Restoration Indication): this bit shall be set to "1" if the CP function re-establishes a PFCP session which was established before the UP function restart. (NOTE X) | X | X | | X | PFCPSEReq-Flags |

NOTE X:

The UP function shall accept the CP function allocated GTP-U F-TEID and/or UE IP address in the PFCP Session Establishment Request message with the RESTU flag set to "1", when the UP function is requested to allocate GTP-U F-TEID and/or UE IP address for other PFCP sessions..

this UP function, so that the UP function shall also accept the request to allocate F-TEID in a new PFCP session establishment.

In an embodiment, the following underline content may be added in clause 16.1A.4 of 3GPP TS23.007 V15.4.0:

Restoration of Sx sessions includes:

if re-establishment of Sx association is required, the SGW-C may start immediately the Sx association setup procedure, and then;

when re-establishing a Sx session and if F-TEID allocation is performed in the SGW-U by network configuration, the SGW-C shall include a restoration indication in the PFCP Session Establishment Request message to indicate to the SGW-U it is for a restoration of an existing PFCP session and the SGW-U shall accept SGW-C allocated F-TEID.

The SGW-U shall accept the request to allocate F-TEID in the subsequent PFCP session signaling.

if the restoration is supported in the SGW-C on a proactive basis, the SGW-C may start re-establishing Sx sessions matching any PDRs.

if the restoration is supported in the SGW-C on a reactive basis:

the SGW-C shall establish an Sx session with a wildcarded PDR to instruct the UP function to forward G-PDU packets which are not matching any other PDRs to the CP function (to a F-TEID uniquely assigned in the CP function for this Sx-u tunnel);

upon receipt of G-PDUs from this Sx-u tunnel, the CP function shall then check if it has an active session for each received G-PDU packet:

if so, the CP function shall perform Sx Session establishment procedures to re-establish the corresponding Sx sessions in the SGW-U;

otherwise the CP function shall generate a GTP-U Error Indication with a destination address set to the source IP address of the received G-PDU, and send it to the UP function. The UP function shall forward this GTP-U Error Indication transparently. The CP function shall delete the G-PDU after the check for active sessions.

In an embodiment, the following underline content may be added in clause 17.1A.4 of 3GPP TS23.007 V15.4.0:

The PGW-C may start restoring Sx sessions in the PGW-U and it may:

if re-establishment of Sx association is required, immediately re-establish the Sx association between the PGW-C and the PGW-U;

re-establish Sx sessions affected by the PGW-U failure.

when re-establishing a Sx session and if F-TEID allocation is performed in the PGW-U by network configuration, the PGW-C shall include a restoration indication in the PFCP Session Establishment Request message to indicate to the PGW-U it is for a restoration of an existing PFCP session and the PGW-U shall accept SGW-C allocated F-TEID.

The PGW-U shall accept the request to allocate F-TEID in the subsequent PFCP session signaling.

In an embodiment, the first session establishment request includes the data restoration flag and the data to be restored in the user plane function, the control plane function may be one of PGW-C, SGW-C, TDF-C, and SMF, and the user plane function may be one of PGW-U, SGW-U, TDF-U and UPF.

In an embodiment, the first session establishment request includes the first Internet Protocol address pool identifier, the control plane function may be one of PGW-C and SMF, and the user plane function may be one of PGW-U or PSA UPF.

In an embodiment, the control plane function may first determine the first IP address pool identifier (for example when receiving a create session request) and send the first session establishment request to the user plane function, wherein the first session establishment request includes the first Internet Protocol address pool identifier. Later the control plane function may determine the data to be restored in the user plane function (for example, when determining the user plane function is restarted) and send another first session establishment request to the user plane function, wherein said another first session establishment request includes the data restoration flag and the data to be restored in the user plane function.

In an embodiment, the control plane function may first determine the control plane function may determine data to be restored in the user plane function (for example when determining that the user plane function is restarted) and send a first session establishment request to the user plane function, wherein the first session establishment request includes the data restoration flag and the data to be restored in the user plane function. Later the control plane function may determine the first IP address pool identifier (for example when receiving a create session request) and send another first session establishment request to the user plane function, wherein said another first session establishment request includes the first Internet Protocol address pool identifier.

In an embodiment, the control plane function may only determine the data to be restored in the user plane function (for example when determining that the user plane function is restarted) and send another first session establishment request to the user plane function, wherein the first session establishment request includes the data restoration flag and the data to be restored in the user plane function.

In an embodiment, the control plane function may only determine the first Internet Protocol address pool identifier (for example when receiving a create session request) and send the first session establishment request to the user plane function, wherein the first session establishment request includes the first Internet Protocol address pool identifier.

FIG. 4 shows a flowchart of a method according to another embodiment of the present disclosure, which may be performed by an apparatus implemented in/as or communicatively coupled to a control plane function. As such, the apparatus may provide means or modules for accomplishing various parts of the method block 400 as well as means or modules for accomplishing other processes in conjunction with other components. The control plane function may be any suitable entity or node which can implement the control plane function. For example, the control plane function may be SGW-C, PGW-C, TDF-C, or SMF, etc. For some parts which have been described in the above embodiments, the description thereof is omitted here for brevity.

At block 402, the control plane function may receive a heartbeat message including a new recovery time stamp from the user plane function. This heartbeat message may contain the time stamp when the user plane function was started. The heartbeat message may be a heartbeat request or heartbeat response. In an embodiment, the heartbeat request and the heartbeat response may be similar to the corresponding Heartbeat Request or Heartbeat Response as described in clause 7.4.2 of 3GPP TS29.244 V16.0.0.

At block 404, the control plane function may determine data to be restored in the user plane function in response to receiving the heartbeat message including the new recovery time stamp from the user plane function.

At block 406, the control plane function may send a first session establishment request to the user plane function. The first session establishment request may include a data restoration flag and the data to be restored in the user plane function.

The method 400 may be referred to as a proactive restoration method. When the control plane function receives a heartbeat message including a new recovery time stamp from the user plane function, the control plane func- In an embodiment, a new IE UE IP Address Pool ID (i.e., the second Internet Protocol address pool identifier) may be introduced in Table 7.5.2.1-1 of 3GPP TS29.244 V16.0.0, the control plane function such as PGW-C or SMF may sends the PFCP Session Establishment request with this new IE to the user plane function such as PGW-U or PSA UPF. This embodiment can solve the problem 3 as described above.

TABLE 7.5.2.1-1

| Information Elements in an PFCP Session Establishment Request | | | | | | | | |
|---|---|---|---|---|---|---|---|---|
| Information | | | | | | Appl. | | |
| elements | P | Condition/Comment | | | Sxa | Sxb | Sxc | N4 | IE Type |
| UE IP Address Pool ID | O | This IE shall be set: when there is PFCPSEReq-Flags/RESTU indicates this PFCP Session Establishment Request used for restoration, the CP function requests the UP only forwarding the payload IP packet which IP address belonging to this IP-Pool-ID. when there is no PFCPSEReq-Flags/RESTU indicates this PFCP Session Establishment Request used for restoration, the CP function requests that the UP assigns the UE IP address from this IP-Pool-ID, which is selected by CP based on conditions, e.g UE Location Information and/or RAT type and/or roaming information) | | — | X | X | X | UE IP Address Pool ID | tion knows the user plane function restarted, and can start either proactive restoration method or reactive restoration method. For proactive restoration method, the control plane function can send a session establishment request with the stored information to the user plane function.

FIG. 5 shows a flowchart of a method according to another embodiment of the present disclosure, which may be performed by an apparatus implemented in/as or communicatively coupled to a control plane function. As such, the apparatus may provide means or modules for accomplishing various parts of the method 500 as well as means or modules for accomplishing other processes in conjunction with other components. The control plane function may be any suitable entity or node which can implement the control plane function. For example, the control plane function may be SGW-C, PGW-C, TDF-C, or SMF, etc. For some parts which have been described in the above embodiments, the description thereof is omitted here for brevity.

At block 502, the control plane function may receive a heartbeat message including a new recovery time stamp from the user plane function. Block 502 is similar to block 402 of FIG. 4.

At block 504, the control plane function may send a second session establishment request to the user plane function. The second session establishment request may include a wildcarded packet detection rule to instruct the user plane function to forward a packet which does not match any other packet detection rules to the control plane function. In an embodiment, when the user plane function is PGW-U or PSA UPF, the second session establishment request may further include a second Internet Protocol address pool identifier which is used by the user plane function to only forward a packet whose either source IP address or destination IP address belonging to the second Internet Protocol address pool identifier. In an embodiment, the second session establishment request may be a PFCP session establishment request.

At block 506, the control plane function may receive a packet forwarded by the user plane function. The packet does not match said any other packet detection rules. In an embodiment, when the user plane function is PGW-U or PSA UPF, the source IP address or destination IP address of the packet belongs to the second Internet Protocol address pool identifier.

At block 508, the control plane function may determine data to be restored in an user plane function in response to receiving the packet forwarded by the user plane function. For example, the control plane function may find the corresponding stored PFCP sessions and PFCP information such as F-TEID u, UE IP address, PDR, FAR, URR (Usage Reporting Rule), etc.

At block 510, the control plane function may send a first session establishment request to the user plane function. The first session establishment request may include a data restoration flag and the data to be restored in the user plane function.

The method 500 may be referred to as a reactive restoration method. When the control plane function receives a heartbeat message including a new recovery time stamp from the user plane function, the control plane function knows the user plane function restarted, and can start either proactive restoration method or reactive restoration method. For reactive restoration method, the control plane function can send the second session establishment request to the user plane function, receive a packet forwarded by the user plane function, determine data to be restored in the user plane function in response to receiving the packet forwarded by the user plane function and send the first session establishment request to the user plane function, wherein the first session establishment request may include the data restoration flag and the data to be restored in the user plane function.

FIG. 6 shows a flowchart of a method according to an embodiment of the present disclosure, which may be performed by an apparatus implemented in/as or communicatively coupled to a control plane function. As such, the apparatus may provide means or modules for accomplishing various parts of the method 600 as well as means or modules for accomplishing other processes in conjunction with other components. The control plane function may be any suitable entity or node which can implement the control plane function. For example, the control plane function may be PGW-C or SMF, etc. For some parts which have been described in the above embodiments, the description thereof is omitted here for brevity.

At block 602, the control plane function may receive a create session request. The create session request may be received from any suitable network node or function.

At block 604, the control plane function may select an Internet Protocol address range based on at least one of a location of the user equipment, a type of radio access technology of the user equipment, or roaming information of the user equipment among the multiple IP pool ranges.

At block 606, the control plane function may select the first Internet Protocol address pool identifier corresponding to the Internet Protocol address range.

At block 608, the control plane function may send a first session establishment request to the user plane function. The first session establishment request may include the first Internet Protocol address pool identifier. The first Internet Protocol address pool identifier may be used by the user plane function to assign an IP address to a user equipment from the first Internet Protocol address pool identifier.

FIG. 7 shows a flowchart of a method according to an embodiment of the present disclosure, which may be performed by an apparatus implemented in/as or communicatively coupled to a user plane function. As such, the apparatus may provide means or modules for accomplishing various parts of the method 700 as well as means or modules for accomplishing other processes in conjunction with other components. The user plane function may be any suitable entity or node which can implement the user plane function. For example, the user plane function may be SGW-U, PGW-U, TDF-U, or UPF, etc. For some parts which have been described in the above embodiments, the description thereof is omitted here for brevity.

At block 702, the user plane function may receive a first session establishment request from a control plane function. The first session establishment request may include a data restoration flag and data to be restored in the user plane function or includes a first Internet Protocol (IP) address pool identifier. The first Internet Protocol address pool identifier may be used by the user plane function to assign an IP address to a user equipment from the first Internet Protocol address pool identifier. For example, the control plane function may send the first session establishment request block 304 of FIG. 3, and then the user plane function may receive the first session establishment request.

In an embodiment, the data restoration flag may be set when the control plane function requests the user plane function to restore the data in the user plane function.

In an embodiment, the data restoration flag may be included in an information element which is included in the first session establishment request.

In an embodiment, the data to be restored in the user plane function may be a packet forwarding control Protocol, PFCP, session information.

In an embodiment, the data to be restored in the user plane function may include at least one of F-TEID-u information element and user equipment Internet Protocol address information element in PDI or F-TEID-u information element and user equipment Internet Protocol address information element in Create Traffic Endpoint.

In an embodiment, the user plane function may be a restarted user plane function.

In an embodiment, the first Internet Protocol address pool identifier may be selected based on at least one of a location of the user equipment, a type of radio access technology of the user equipment, or roaming information of the user equipment.

In an embodiment, the first session establishment request may be a packet forwarding control Protocol (PFCP) session establishment request.

At block 704, the user plane function may process the first session establishment request. For example, when the first session establishment request includes a data restoration flag and the data to be restored in the user plane function, the user plane function may use the data to be restored in the user plane function such as the PFCP session information (F-TEID-u, UE IP address, PDR/FAR rule) to restore this PFCP session in the restarted user plane function and send a first session establishment response such as the PFCP Session Establishment Response to the control plane function. When the first session establishment request includes the first Internet Protocol (IP) address pool identifier, the user plane function may accept this Session Establishment Request and assign the IP address from the first Internet Protocol (IP) address pool identifier for the UE's PDN connection and send a first session establishment response such as the PFCP Session Establishment Response to the control plane function.

Figure 8:
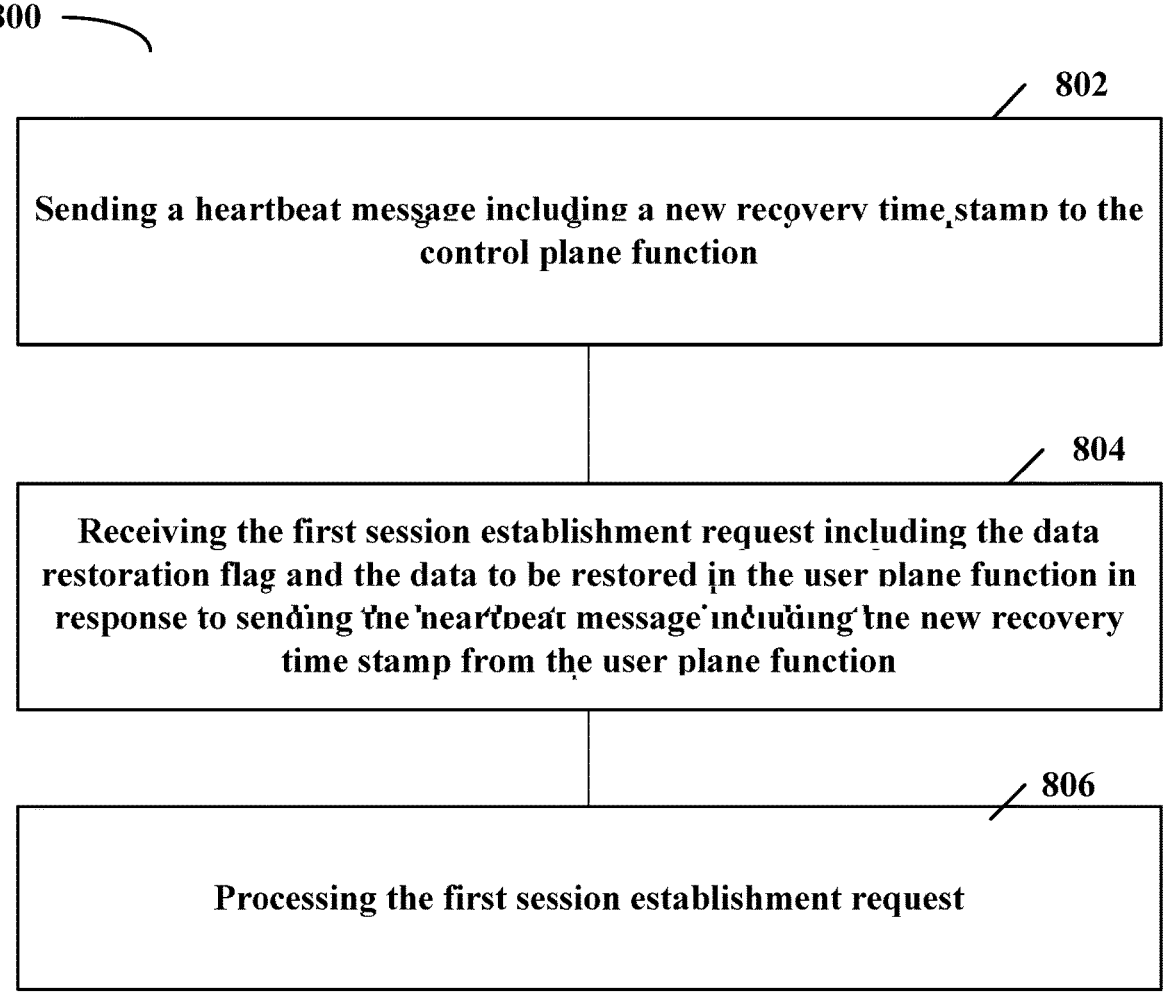
FIG. 8 shows a flowchart of a method according to another embodiment of the present disclosure.

FIG. 8 shows a flowchart of a method according to an embodiment of the present disclosure, which may be performed by an apparatus implemented in/as or communicatively coupled to a user plane function. As such, the apparatus may provide means or modules for accomplishing various parts of the method 800 as well as means or modules for accomplishing other processes in conjunction with other components. The user plane function may be any suitable entity or node which can implement the user plane function. For example, the user plane function may be SGW-U, PGW-U, TDF-U, or UPF, etc. For some parts which have been described in the above embodiments, the description thereof is omitted here for brevity.

At block 802, the user plane function may send a heartbeat message including a new recovery time stamp to the control plane function. For example, when the user plane function is restarted, the user plane function may send the heartbeat message including the new recovery time stamp to the control plane function. The heartbeat message may be a heartbeat request message or a heartbeat response message.

At block 804, the user plane function may receive the first session establishment request including the data restoration flag and the data to be restored in the user plane function in response to sending the heartbeat message including the new recovery time stamp from the user plane function.

At block 806, the user plane function may process the first session establishment request.

FIG. 9 shows a flowchart of a method according to an embodiment of the present disclosure, which may be performed by an apparatus implemented in/as or communicatively coupled to a user plane function. As such, the apparatus may provide means or modules for accomplishing various parts of the method 900 as well as means or modules for accomplishing other processes in conjunction with other components. The user plane function may be any suitable entity or node which can implement the user plane function. For example, the user plane function may be SGW-U, PGW-U, TDF-U, or UPF, etc. For some parts which have been described in the above embodiments, the description thereof is omitted here for brevity.

At block 902, the user plane function may send a heartbeat message including a new recovery time stamp to the control plane function. For example, when the user plane function is restarted, the user plane function may send the heartbeat message including the new recovery time stamp to the control plane function. The heartbeat message may be a heartbeat request message or a heartbeat response message.

At block 904, the user plane function may receive a second session establishment request from the control plane function. The second session establishment request may include a wildcarded packet detection rule to instruct the user plane function to forward a packet which does not match any other packet detection rules to the control plane function. In an embodiment, when the user plane function is PGW-U or PSA UPF, the second session establishment request may further include a second Internet Protocol address pool identifier which is used by the user plane function to only forward a packet whose either source IP address or destination IP address belonging to the second Internet Protocol address pool identifier. In an embodiment, the second session establishment request may be a PFCP session establishment request.

At block 906, the user plane function may send a packet to the control plane function. The packet does not match said any other packet detection rules. In an embodiment, when the user plane function is PGW-U or PSA UPF, the source IP address or destination IP address of the packet belongs to the second Internet Protocol address pool identifier.

At block 908, the user plane function may receive the first session establishment request including the data restoration flag and the data to be restored in the user plane function in response to sending the packet to the control plane function.

At block 910, the user plane function may process the first session establishment request.

According to various embodiments, the data restoration flag may be used to solve the problem 1 and problem 2 as described above. For example, the new IE PFCPSEReq-Flags may be introduced on a message level to indicate that this PFCP Session Establishment Request message is used for PFCP Session Restoration procedure on a reactive basis for the failed user plane function such as UPF. When the user plane function such as UPF receives a session establishment request such as PFCP Session Establishment Request with PFCPSEReq-Flags from the control plane function, the user plane function will treat this session establishment request using for session restoration procedure for the user plane function such as UPF. The user plane function such as UPF will store the information such as PFCP information received in session establishment request message, for example, the following IE which allocated by UP originally:

F-TEID-u IE in Created PDR/PDI
F-TEID-u IE in Created Traffic Endpoint
UE IP address in Created PDR/PDI
UE IP address in Created Traffic Endpoint According to various embodiments, for data restoration in the user plane function, a new IE UE IP address pool ID may be introduced in the session establishment request such as PFCP Session Establishment Request to solve the problem 3 as described above. For example, the control plane function may send a session establishment request such as PFCP Session Establishment Request with the UE IP address pool ID to the user plane function.

According to various embodiments, for a create session request, a new IE UE IP address pool ID may be introduced in the session establishment request such as PFCP Session Establishment Request to solve the problem 4 as described above. For example, the control plane function may select a specific IP address range among the multiple IP pool ranges for a user plane function such as UPF, e.g., location based UE IP address selection (which supported in non-CUPS) and/or RAT type based UE IP address selection and/or roaming based UE IP address selection. The control plane function can select the user plane function such as UPF, select an IP address range according to UE location and/or RAT type and/or roaming information among the multiple IP pool ranges, send the corresponding UE IP address pool ID to the user plane function such as UPF, and require the user plane function such as UPF to assign the IP address from this UE IP address pool ID for a PDN connection.

Figure 10:
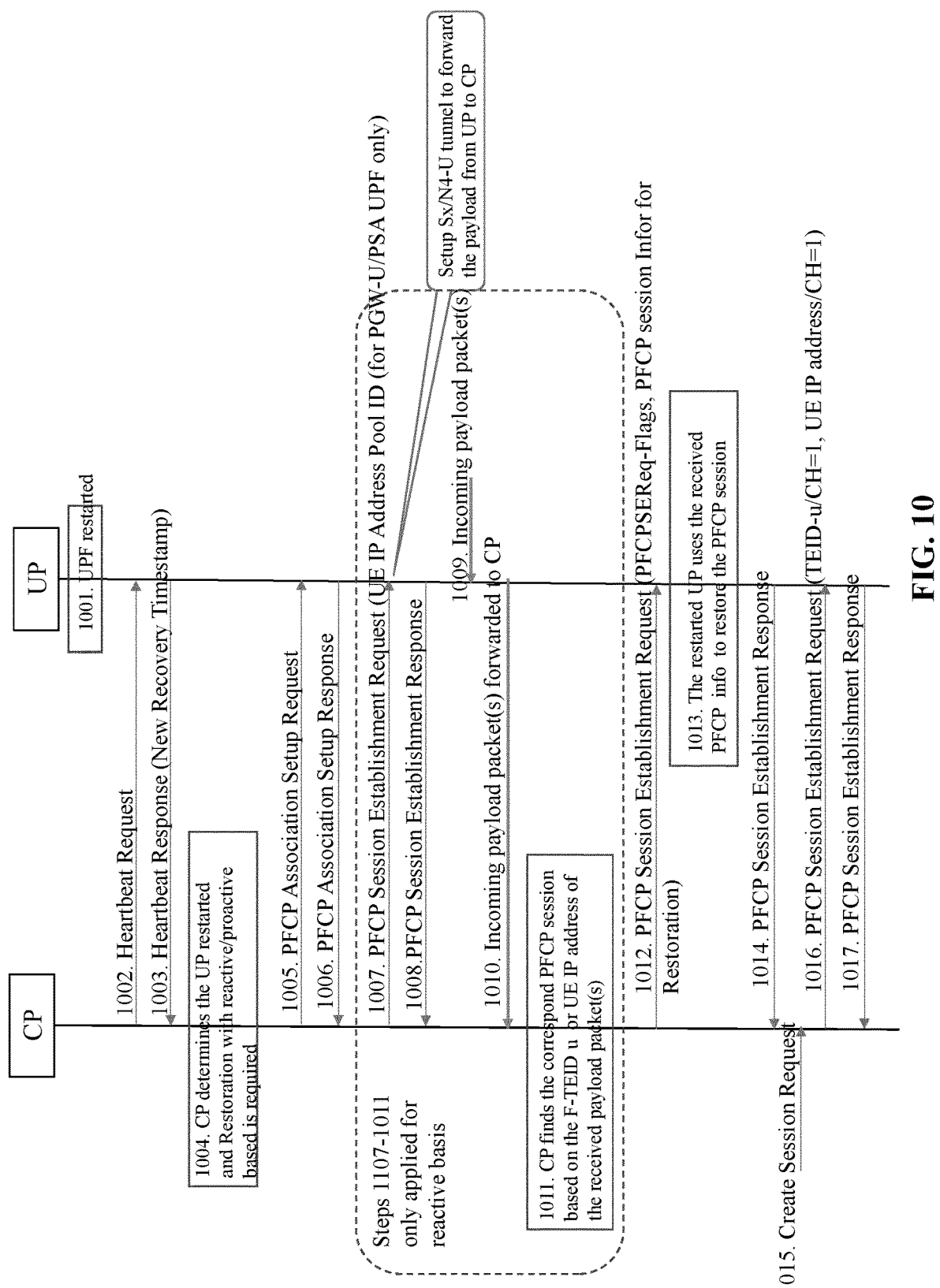
FIG. 10 shows a flowchart of a method according to another embodiment of the present disclosure.

FIG. 10 shows a flowchart of a method according to an embodiment of the present disclosure.

At step 1001, UP is restarted.

At step 1002, CP sends a Heartbeat Request to UP.

At step 1003, CP receives a Heartbeat Response including a New Recovery Timestamp from UP.

At step 1004, CP determines that the UP is restarted and restoration with reactive or proactive based is required.

At step 1005, CP sends a PFCP Association Setup Request to UP to re-establish PFCP association.

At step 1006, CP receives a PFCP Association Setup Response from UP.

It is noted that steps 1007-1011 are applied for reactive restoration only.

At step 1007, CP sends a PFCP Session Establishment Request to UP. Step 1107 is used to setup Sx/N4-U tunnel to forward the payload from UP to CP. When UP is PGW-U or PSA UPF, the PFCP Session Establishment Request may include UE IP address pool ID. For example, the CP may establish an PFCP session with a wildcarded PDR to instruct the UP function to forward G-PDU/T-PDU packets which are not matching any other PDRs to the CP function (to a F-TEID uniquely assigned in the CP function for this Sx/N4-u tunnel). For PGW-U and PSA UPF, the CP also includes the second UE IP address pool ID in the PFCP Session Establishment Request to instruct the UP only forwarding the payload IP packet whose either source IP address or destination IP address belonging to the second UE IP address pool ID on this new Sx/N4-u tunnel.

At step 1008, CP receives a PFCP Session Establishment Response from UP.

At step 1009, UP receives incoming payload packet(s).

At step 1010, UP forwards the incoming payload packet(s) to CP. For example, UP determines that the incoming payload packet(s) are not matching any other PDRs. When the UP is PGW-U and PSA UPF, the UP also determines the source IP address or destination IP address of the incoming payload packet(s) belongs to the second UE IP address pool ID.

At step 1011, CP finds the correspond PFCP session based on the F-TEID-u or UE IP address of the received payload packet(s). For example, when the CP receives the G-PDU/T-PDU on the Sx/N4-u tunnel from the UP, the CP finds the corresponding stored PFCP sessions and PFCP information.

At step 1012, CP sends PFCP Session Establishment Request including PFCPSEReq-Flags and PFCP session Information for restoration to UP to re-establish the PFCP session.

For the F-TEID IE in Create PDR/PDI, Create Traffic Endpoint, CH bit will not set to 1 since no need UP allocated F-TEID, and need UP use the F-TEID u in the request message.

For the UE IP Address IE in Create PDR/PDI, Create Traffic Endpoint, CH bit will not set to 1 since no need UP allocated UE IP address, and need UP use the UE IP Address (stored in CP) in the request message.

At step 1013, the restarted UP uses the received PFCP information to restore the PFCP session. For example, UP uses the PFCP session information (F-TEID-u, UE IP address, PDR/FAR rule, etc.) to restore this PFCP session in the restarted UP.

At step 1014, UP sends the PFCP Session Establishment Response to the CP.

At step 1015, CP receives a Create Session Request.

At step 1016, CP sends PFCP Session Establishment Request including TEID-u/CH=1 and UE IP address/CH=1 to UP. For example, the CP will send PFCP Session Establishment request with CH=1 to ask UP to allocate the F-TEIDu for this PFCP session since the UP allocated F-TEIDu method/UE allocated IP address is decided according to the configuration at the beginning. The UPF will accept this PFCP Session Establishment Request, since the UPF knows the previous PFCP Session Establishment Request (i.e., step 1012) with CH not set 1 is for PFCP Session Restoration procedure.

At step 1017, UP sends a PFCP Session Establishment Response to CP.

Some messages as shown in FIG. 10 are similar to the corresponding messages as described in 3GPP specifications such as 3GPP TS23.214 V16.0.0 and TS29.244 V16.0.0, etc., the description thereof is omitted here for brevity.

Embodiments herein afford many advantages, of which a non-exhaustive list of examples follows. Some embodiments herein may provide a clear logic for F-TEID u allocation for PFCP Session Restoration proactive and/or reactive mode for the failed user plane function such as UPF and may avoid the user plane function such as UPF rejecting the Session Establishment Request message such as PFCP Session Establishment Request message. Some embodiments herein may provide a clear logic for UE IP address allocation for PFCP Session Restoration proactive and/or reactive mode for the failed the user plane function such as UPF and may avoid the user plane function such as UPF rejecting the PFCP Session Establishment Request message. Some embodiments herein may solve at least one of the above described problems when the UE IP address is assigned by the external PDN. Some embodiments herein may enable the reactive restoration method supporting for PGW-U failure and UPF-A failure. Some embodiments herein may provide an efficient way for the UP forwarding the T-PDU payload traffic to the correct CP during the PFCP Session Restoration procedure. For UP allocating UE IP address method, some embodiments herein may provide a solution when the operator requires to assign a specific IP address range based on a condition, e.g., location based UE IP address selection, RAT type based UE IP address selection, roaming based UE IP address selection). The embodiments herein are not limited to the features and advantages mentioned above. A person skilled in the art will recognize additional features and advantages upon reading the following detailed description.

Figure 11:
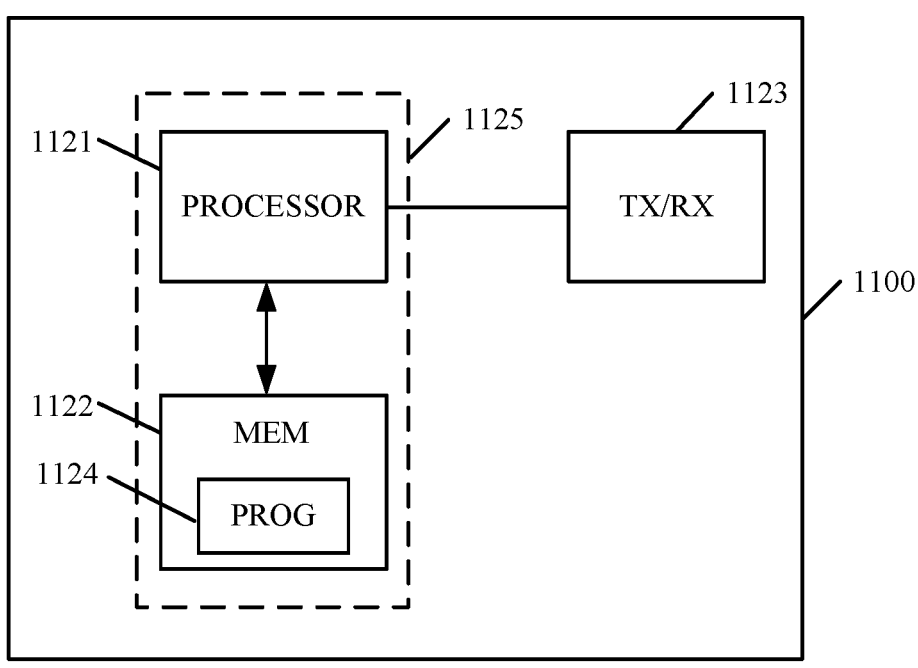
FIG. 11 is a block diagram showing an apparatus suitable for use in practicing some embodiments of the disclosure.

FIG. 11 is a block diagram showing an apparatus suitable for use in practicing some embodiments of the disclosure. For example, any one of the control plane function and the user plane function described above may be implemented through the apparatus 1100.

The apparatus 1100 comprises at least one processor 1121, such as a DP, and at least one MEM 1122 coupled to the processor 1121. The apparatus 1120 may further comprise a transmitter TX and receiver RX 1123 coupled to the processor 1121. The MEM 1122 stores a PROG 1124. The PROG 1124 may include instructions that, when executed on the associated processor 1121, enable the apparatus 1120 to operate in accordance with the embodiments of the present disclosure. A combination of the at least one processor 1121 and the at least one MEM 1122 may form processing means 1125 adapted to implement various embodiments of the present disclosure.

Various embodiments of the present disclosure may be implemented by computer program executable by one or more of the processor 1121, software, firmware, hardware or in a combination thereof.

The MEM 1122 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1121 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the control plane function, the memory 1122 contains instructions executable by the processor 1121, whereby the control plane function operates according to any one of the methods 300, 400, 500 and 600 as described in reference to FIGS. 3-6.

In an embodiment where the apparatus is implemented as or at the user plane function, the memory 1122 contains instructions executable by the processor 1121, whereby the user plane function operates according to any one of the methods 700, 800, and 900 as described in reference to FIGS. 7-9.

Figure 12:
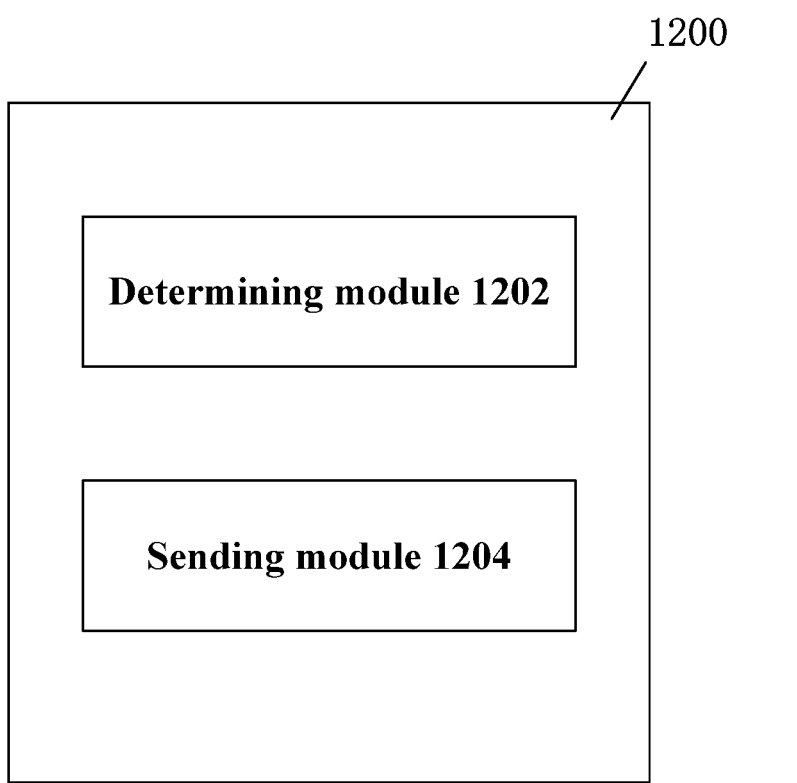
FIG. 12 illustrates a simplified block diagram of a control plane function according to an embodiment of the present disclosure.

FIG. 12 illustrates a simplified block diagram of a control plane function according to an embodiment of the present disclosure. The control plane function may be one of PGW-C, SGW-C, TDF-C, and S1VIF. The control plane function 1200 comprises a determining module 1202 configured to determine data to be restored in an user plane function or a first Internet Protocol (IP) address pool identifier. The control plane function 1200 further comprises a sending 1204 configured to send a first session establishment request to the user plane function, wherein the first session establishment request includes a data restoration flag and the data to be restored in the user plane function or includes the first Internet Protocol address pool identifier. The first Internet Protocol address pool identifier may be used by the user plane function to assign an IP address to a user equipment from the first Internet Protocol address pool identifier.

Figure 13:
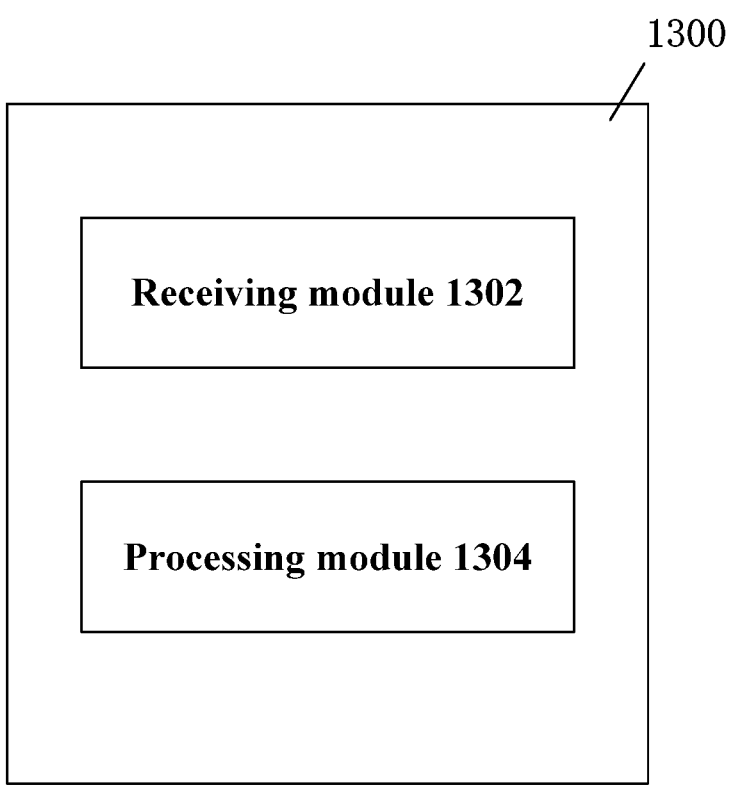
FIG. 13 illustrates a simplified block diagram of a user plane function according to an embodiment of the present disclosure.

FIG. 13 illustrates a simplified block diagram of a user plane function according to an embodiment of the present disclosure. The user plane function may be one of PGW-U, SGW-U, TDF-U, and UPF. The user plane function 1300 comprises a receiving module 1302 configured to receive a first session establishment request from a control plane function. The first session establishment request may include a data restoration flag and data to be restored in the user plane function or includes a first Internet Protocol (IP) address pool identifier. The first Internet Protocol address pool identifier may be used by the user plane function to assign an IP address to a user equipment from the first Internet Protocol address pool identifier. The control plane function 1300 further comprises a processing module 1304 configured to processing the first session establishment request.

According to an aspect of the disclosure it is provided a computer program product being tangibly stored on a computer readable storage medium and including instructions which, when executed on at least one processor, cause the at least one processor to carry out the method related to the control plane function as described above.

According to an aspect of the disclosure it is provided a computer program product being tangibly stored on a computer readable storage medium and including instructions which, when executed on at least one processor, cause the at least one processor to carry out the method related to the user plane function as described above.

According to an aspect of the disclosure it is provided a computer-readable storage medium storing instructions which when executed by at least one processor, cause the at least one processor to perform the method related to the control plane function as described above.

According to an aspect of the disclosure it is provided a computer-readable storage medium storing instructions which when executed by at least one processor, cause the at least one processor to perform the method related to the user plane function as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A A method at a control plane function, comprising:
   determining that a user plane function has been restarted and restoration of an existing communication session with the user plane function is required; and
   sending a first session establishment request to the user plane function, wherein the first session establishment request includes a restoration flag that is set to indicate restoring of the existing communication session instead of establishing a new communication session and wherein the restoration flag is comprised in an information element Packet Forwarding Control Protocol Session Establishment Request (PFCPSEReg)-Flags.

2. The method according to claim 1, further comprising:
   receiving a heartbeat message including a new recovery time stamp from the user plane function, wherein determining that the user plane function has been restarted and restoration of the existing communication session with the user plane function is required is in response to receiving the heartbeat message including the new recovery time stamp.

3. The method according to claim 1, further comprising:
   sending a second session establishment request to the user plane function, wherein the second session establishment request includes a wildcarded packet detection rule to instruct the user plane function to forward a packet which does not match any other packet detection rules to the control plane function.

4. The method according to claim 3, further comprising: receiving a packet forwarded by the user plane function, wherein the packet does not match said any other packet detection rules, wherein determining that the user plane function has been restarted and restoration of the existing communication session with the user plane function is required is in response to receiving the packet forwarded by the user plane function.

5. The method according to claim 3, wherein the second session establishment request is a PFCPSEReq.

6. The method according to claim 1 further comprising: sending session information to the user plane function.

7. The method according to claim 6, wherein the session information includes at least one of:
a fully qualified tunnel endpoint identifier of a general packet radio service tunneling protocol user plane tunnel (F-TEID-u) information element and user equipment Internet Protocol (IP) address information element in Packet Detection Information (PDI); and
F-TEID-u information element and user equipment IP address information element in Create Traffic Endpoint.

8. The method according to claim 1, wherein the first session establishment request is a PFCPSEReq.

9. The method according to claim 1, wherein the control plane function is one of packet data network (PDN) gateway control plane function (PGW-C), serving gateway control plane function (SGW-C), traffic detection function control plane function (TDF-C), and session management function (SMF), and the user plane function is one of PDN gateway user plane function (PGW-U), serving gateway user plane function (SGW-U), traffic detection function user plane function (TDF-U), user plane function (UPF), and packet data unit session anchor user plane function (PSA UPF).

10. A method at a user plane function, comprising: restarting the user plane function;
receiving a first session establishment request from a control plane function, wherein the first session establishment request includes a restoration flag that is set to indicate restoring of an existing communication session instead of establishing a new communication session and wherein the restoration flag is comprised in an information element Packet Forwarding Control Protocol Session Establishment Request (PFCPSEReq)-Flags; and
processing the first session establishment request by restoring the existing communication session instead of establishing a new communication session.

11. The method according to claim 10, further comprising:
sending a heartbeat message including a new recovery time stamp to the control plane function, wherein receiving the first session establishment request is in response to sending the heartbeat message including the new recovery time stamp.

12. The method according to claim 11, further comprising:
receiving a second session establishment request from the control plane function, wherein the second session establishment request includes a wildcarded packet detection rule to instruct the user plane function to forward a packet which does not match any other packet detection rules to the control plane function.

13. The method according to claim 12, further comprising:
sending a packet to the control plane function, wherein the packet does not match said any other packet detection rules, wherein receiving the first session establishment request is in response to sending the packet to the control plane function.

14. The method according to claim 12, wherein the second session establishment request is a PFCPSEReq.

15. The method according to claim 10 further comprising:
receiving session information from the control plane function.

16. The method according to claim 15, wherein the session information includes at least one of:
a fully qualified tunnel endpoint identifier of a general packet radio service tunneling Protocol user plane tunnel (F-TEID-u) information element and user equipment Internet Protocol (IP) address information element in Packet Detection Information (PDI); and
F-TEID-u information element and user equipment IP address information element in Create Traffic Endpoint.

17. An apparatus implemented in a control plane function, comprising:
a processor; and
a memory coupled to the processor, said memory containing instructions which, when executed by said processor, cause said apparatus to:
determine that a user plane function has been restarted and restoration of an existing communication session with the user plane function is required; and
send a first session establishment request to the user plane function, wherein the first session establishment request includes a restoration flag that is set to indicate restoring of the existing communication session instead of establishing a new communication session and wherein the restoration flag is comprised in an information element Packet Forwarding Control Protocol Session Establishment Request (PFCPSEReq)-Flags.

18. An apparatus implemented in a user plane function, comprising:
a processor; and
a memory coupled to the processor, said memory containing instructions which, when executed by said processor, cause said apparatus to:
restart the user plane function;
receive a first session establishment request from a control plane function, wherein the first session establishment request includes a restoration flag that is set to indicate restoring of an existing communication session instead of establishing a new communication session and wherein the restoration flag is comprised in an information element Packet Forwarding Control Protocol Session Establishment Request (PFCPSEReq)-Flags; and
process the first session establishment request by restoring the existing communication session instead of establishing a new communication session.

* * * * *